United States Patent
Huang et al.

(10) Patent No.: US 11,659,555 B2
(45) Date of Patent: May 23, 2023

(54) NON-PERIODIC CHANNEL STATE INFORMATION TRIGGERING AND REPORTING IN WIRELESS COMMUNICATIONS

(71) Applicant: Qualcomm Incorporated, San Diego, CA (US)

(72) Inventors: Yi Huang, San Diego, CA (US); Yu Zhang, Beijing (CN); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/042,677

(22) PCT Filed: Apr. 6, 2018

(86) PCT No.: PCT/CN2018/082083
§ 371 (c)(1),
(2) Date: Sep. 28, 2020

(87) PCT Pub. No.: WO2019/192013
PCT Pub. Date: Oct. 10, 2019

(65) Prior Publication Data
US 2021/0127387 A1    Apr. 29, 2021

(51) Int. Cl.
*H04W 72/04* (2023.01)
*H04L 5/00* (2006.01)

(52) U.S. Cl.
CPC ......... *H04W 72/0413* (2013.01); *H04L 5/001* (2013.01); *H04W 72/042* (2013.01); *H04L 5/0057* (2013.01)

(58) Field of Classification Search
CPC ........... H04W 72/0413; H04W 72/042; H04L 5/001; H04L 5/0057; H04L 5/0055; H04L 5/0064
See application file for complete search history.

(56) References Cited

U.S. PATENT DOCUMENTS

2007/0253411 A1*  11/2007  Arad .................. H04L 47/2441
                                                370/428
2009/0157900 A1*  6/2009  Ge ....................... H04L 69/167
                                                709/236

(Continued)

FOREIGN PATENT DOCUMENTS

| WO | WO-2013010468 A1 | 1/2013 |
| WO | WO-2016122122 A1 | 8/2016 |
| WO | WO-2017053738 A1 | 3/2017 |

OTHER PUBLICATIONS

Ericsson: "Summary of Contributions on PUCCH Structure for Short Duration", 3GPP Draft, 3GPP TSG RAN WG1 Meeting#91, R1-1721448—Short PUCCH Summary V2, 3rd Generation Partnership Project (3GPP), Mobile Competence Centre, 650, Route Des Lucioles, F-06921 Sophia-Antipolis Cedex, France, vol. RAN WG1, No. Reno, Nevada, Nov. 27, 2017-Dec. 1, 2017 Nov. 28, 2017 (Nov. 28, 2017), XP051363894, 19 Pages, Retrieved from the Internet: URL:http://www.3gpp.org/ftp/Meetings%5F3GPP%5FSYNC/RAN1/Docs/ [retrieved on Nov. 28, 2017] Sections 3.2, 3.4.

(Continued)

*Primary Examiner* — Christine Ng
(74) *Attorney, Agent, or Firm* — Qualcomm Incorporated

(57) ABSTRACT

Methods, systems, and devices for wireless communications are described that support non-periodic channel state information (CSI) triggering and reporting in wireless communications. In cases where two or more CSI report requests trigger multiple CSI report transmissions in an same uplink slot, a user equipment (UE) may format at least a subset of (Continued)

the multiple CSI reports according to a formatting configuration for transmission of multiple CSI reports in a same uplink slot. The UE may use allocated resources in the uplink slot for each CSI report that are allocated by the base station in the corresponding CSI report request. In some cases, the UE may combine the multiple CSI reports, or parts thereof, into a combined CSI report that may be transmitted using allocated resources of one of the CSI report requests.

64 Claims, 23 Drawing Sheets

(56) References Cited

U.S. PATENT DOCUMENTS

| | | | | |
|---|---|---|---|---|
| 2010/0272036 | A1* | 10/2010 | Ramakrishna | H04L 5/0039 370/329 |
| 2010/0284314 | A1* | 11/2010 | Pelletier | H04L 47/30 375/295 |
| 2011/0083035 | A1* | 4/2011 | Liu | H04W 72/005 714/E11.071 |
| 2012/0039252 | A1 | 2/2012 | Damnjanovic et al. | |
| 2012/0127869 | A1* | 5/2012 | Yin | H04W 28/06 370/252 |
| 2013/0114554 | A1 | 5/2013 | Yang et al. | |
| 2013/0148613 | A1* | 6/2013 | Han | H04L 1/1671 370/329 |
| 2013/0336244 | A1* | 12/2013 | Kuo | H04L 27/2601 370/328 |
| 2014/0010126 | A1 | 1/2014 | Sayana et al. | |
| 2014/0086174 | A1 | 3/2014 | Nam et al. | |
| 2015/0029971 | A1* | 1/2015 | Nishio | H04W 72/0406 370/329 |
| 2015/0207604 | A1* | 7/2015 | Sun | H04B 7/0626 370/329 |
| 2016/0100382 | A1* | 4/2016 | He | H04L 5/001 370/329 |
| 2016/0198020 | A1* | 7/2016 | Zhao | H04L 69/166 709/223 |
| 2016/0219618 | A1 | 7/2016 | Rico et al. | |
| 2016/0227519 | A1 | 8/2016 | Nimbalker et al. | |
| 2017/0230913 | A1* | 8/2017 | Ouchi | H04W 74/0833 |
| 2017/0244513 | A1* | 8/2017 | Pitakdumrongkija | H04B 7/0452 |
| 2017/0273056 | A1* | 9/2017 | Papasakellariou | H04W 52/325 |
| 2017/0366998 | A1 | 12/2017 | Lee et al. | |
| 2018/0049047 | A1* | 2/2018 | Lin | H04W 24/02 |
| 2018/0083684 | A1* | 3/2018 | He | H04B 7/0626 |
| 2018/0234870 | A1* | 8/2018 | Lee | H04W 72/0406 |
| 2018/0287757 | A1* | 10/2018 | Onggosanusi | H04B 7/0456 |
| 2019/0037608 | A1* | 1/2019 | Harada | H04W 16/14 |
| 2020/0163081 | A1* | 5/2020 | Kim | H04L 5/0057 |
| 2020/0177254 | A1* | 6/2020 | Lee | H04B 7/0632 |
| 2020/0304192 | A1* | 9/2020 | Yum | H04L 1/0069 |
| 2021/0006315 | A1* | 1/2021 | Wu | H04L 1/0073 |
| 2021/0022129 | A1* | 1/2021 | Yuan | H04W 72/04 |

OTHER PUBLICATIONS

Ericsson: "TP on SPUCCH Corrections in 36.213", 3GPP Draft, 3GPP TSG-RAN WG1 Meeting #92, Tdoc R1-1802931—SPUCCH Corrections in 36213, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018 Feb. 16, 2018 (Feb. 16, 2018), XP051397383, 12 Pages, Retrieved from the Internet: URL:http://www.3gpp.org/ftp/tsg%5Fran/WG1%5FRL1/TSGR1%5F92/Docs/ [retrieved on Feb. 16, 2018] Sections 10.1, 10.1.1.
LG Electronics: "Simultaneous CSI+ACK/NACK Transmission on PUCCH Format 3", 3GPP Draft, 3GPP TSG RAN WG1 #66, R1-112329 CSI+AN Joint Coding on PF3 (Final), 3rd Generation Partnership Project (3GPP), Mobile Competence Centre, 650, Route Des Lucioles, F-06921 Sophia-Antipolis Cedex, France, vol. RAN WG1, No. Athens, Greece, Aug. 22, 2011, Aug. 16, 2011 (Aug. 16, 2011), XP050537467, 2 Pages, [retrieved on Aug. 16, 2011] Sections 1.2.
Qualcomm Incorporated: "Maintenance for CSI Measurement", 3GPP Draft, 3GPP TSG RAN WG1 Meeting #92, R1-1802821 Maintenance for CSI Measurement, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018 Feb. 17, 2018 (Feb. 17, 2018), XP051398234, pp. 1-9, Retrieved from the Internet: URL:http://www.3gpp.org/ftp/tsg%5Fran/WG1%5FRL1/TSGR1%5F92/Docs/ [retrieved on Feb. 17, 2018] Figures 1.2, Sections 2.1, 3.2, 4.1, 4.2, 5.1.
Supplementary Partial European Search Report—EP18913906—Search Authority—The Hague—dated Oct. 25, 2021.
ZTE: "On CSI Framework Details", 3GPP Draft, 3GPP TSG RAN WG1 NR AdHoc#2, R1-1710187 on CSI Framework Details, 3rd Generation Partnership Project (3GPP), Mobile Competence Centre, 650, Route Des Lucioles, F-06921 Sophia-Antipolis Cedex, France, vol. RAN WG1, No. Qingdao, China, Jun. 27, 2017-Jun. 30, 2017 Jun. 26, 2017 (Jun. 26, 2017), XP051299411, 13 Pages, Retrieved from the Internet: URL:http://www.3gpp.org/ftp/Meetings_3GPP_SYNC/RAN1/Docs/ [retrieved on Jun. 26, 2017] Figure 4, Sections 1, 2.1-2.4.
International Search Report and Written Opinion—PCT/CN2018/082083—ISA/EPO—dated Jan. 9, 2019.
Ericsson: "On Remaining Details of CSI Reporting", 3GPP Draft, 3GPP TSG RAN WG1 Meeting 90bis, R1-1718432 on Remaining Details of CSI Reporting, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017 Oct. 8, 2017 (Oct. 8, 2017), XP051341614, 11 Pages, Retrieved from the Internet: URL: http://www.3gpp.org/ftp/Meetings_3GPP_SYNC/RAN1/Docs/ [retrieved on Oct. 8, 2017] Sections 1-3, 5.
Huawei, et al., "On CSI Feedback in NR", 3GPP Draft, 3GPP TSG RAN WG1 Meeting #91, R1-1719834, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017 Nov. 18, 2017 (Nov. 18, 2017), XP051369557, 5 Pages, Retrieved from the Internet: URL: http://www.3gpp.org/ftp/tsg%5Fran/WG1%5FRL1/TSGR1%5F91/Docs/ [retrieved on Nov. 18, 2017] Figure 1, Sections 1, 2.3.
Huawei, et al., "Remaining Issues for CSI Framework", 3GPP Draft, 3GPP TSG RAN WG1 Meeting #91, R1-1719426, 3rd Generation Partnership Project (3GPP), Mobile Competence Centre, 650, Route Des Lucioles, F-06921 Sophia-Antipolis Cedex, France, Nov. 17, 2017 (Nov. 17, 2017), XP051369128, pp. 1-8, Retrieved from the Internet: URL: http://www.3gpp.org/ftp/tsg%5Fran/WG1%5FRL1/TSGR1%5F91/Docs/ Sections 1, 2.1.1, 2.1.2, 2.2.1, 3.1-3.3.
Huawei, et al., "Remaining Issues for CSX Reporting", 3GPP Draft, 3GPP TSG RAN WG1 Meeting #91, R1-1719425, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017 Nov. 17, 2017 (Nov. 17, 2017), XP051369127, 9 Pages, Retrieved from the Internet: URL: http://www.3gpp.org/ftp/tsg%5Fran/WG1%5FRL1/TSGR1%5F91/Docs/ [retrieved on Nov. 17, 2017] Figure 3, Sections 2-4, 7.
Qualcomm Incorporated: "CSI Feedback", 3GPP Draft, 3GPP TSG RAN WG1 #82, R1-153857 CSI Feedback, 3rd Generation Partnership Project (3GPP), Mobile Competence Centre, 650, Route Des Lucioles, F-06921 Sophia-Antipolis Cedex, France, vol. RAN WG1, No. Beijing, China, Aug. 24, 2015-Aug. 28, 2015 Aug. 23, 2015 (Aug. 23, 2015), XP051001294, pp. 1-2, Retrieved from the Internet: URL: http://www.3gpp.org/ftp/Meetings_3GPP_SYNC/RAN1/Docs/ [retrieved on Aug. 23, 2015] Section 2.
Supplementary European Search Report—EP18913906—Search Authority—The Hague—dated Mar. 23, 2022.

(56) References Cited

OTHER PUBLICATIONS

ERICSSON: "Summary of CSI Reporting v3", 3GPP TSG-RAN WG1 Meeting #92, 3GPP Draft; R1-1803301 Summary of CSI Reporting V3, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 26, 2018, pp. 1-15, XP051398414, The whole document.

\* cited by examiner

NON-PERIODIC CHANNEL STATE INFORMATION TRIGGERING AND REPORTING IN WIRELESS COMMUNICATIONS

CROSS REFERENCE

The present application is a 371 national phase of International Patent Application No. PCT/CN2018/082083 by HUANG et al., entitled "NON-PERIODIC CHANNEL STATE INFORMATION TRIGGERING AND REPORTING IN WIRELESS COMMUNICATIONS," filed Apr. 6, 2018, assigned to the assignee hereof.

BACKGROUND

The following relates generally to wireless communications, and more specifically to non-periodic channel state information triggering and reporting in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, channel state information (CSI) reporting may be used to increase the reliability of a communications link. For example, a UE may generate a CSI report based on channel conditions observed by the UE (e.g., based on a signal to noise ratio (SNR) of a CSI reference signal (CSI-RS) transmitted by a base station), and transmit the CSI report to the base station. In some cases, the base station may modify transmission parameters for a subsequent transmission to the UE based on the information received in the CSI report. In some cases, a base station may request non-periodic CSI reports, such as aperiodic CSI reports or semi-persistent CSI reports, and a UE may generate one or more CSI reports based on the non-periodic CSI report requests. In some cases, a base station may request a CSI report for multiple component carriers (CCs) that may be configured at a UE. Multiple CSI report requests and CSI report transmissions may result in scheduling challenges for UEs to transmit CSI reports, and efficient techniques for providing multiple CSI reports across multiple CCs may help enhance network efficiency.

SUMMARY

The described techniques relate to improved methods, systems, devices, and apparatuses that support non-periodic channel state information (CSI) triggering and reporting in wireless communications. Generally, the described techniques provide for transmission of CSI reports in cases where two or more CSI report requests trigger a CSI report transmission in an same uplink slot. In some cases, a base station may transmit a first CSI report request and provide uplink resources in a first uplink slot for transmission of an associated first CSI report. The base station may transmit a second CSI report request, and provide uplink resources in the first uplink slot for transmission of an associated second CSI report. In some cases, a UE receiving multiple CSI report requests with a same uplink slot for report transmission may provide one or more CSI reports in accordance with techniques provided herein.

In some cases, a base station may transmit multiple non-periodic CSI report requests in different downlink slots (e.g., in back-to-back downlink slots) that each trigger a non-periodic CSI report transmission in a same uplink slot. In some cases, a UE receiving such CSI report requests may format at least a subset of the multiple CSI reports according to a formatting configuration for transmission of multiple CSI reports in a same uplink slot. In some cases, the UE may use allocated resources in the uplink slot for each CSI report that are allocated by the base station in the corresponding CSI report request. In other cases, the UE may combine the multiple CSI reports, or parts thereof, into a combined CSI report that may be transmitted using allocated resources of one of the CSI report requests. In further cases, the UE may select one of the CSI report requests and disregard one or more other CSI report requests, and transmit the corresponding CSI report.

In some cases, a base station may provide a non-periodic CSI report request in downlink control information (DCI) that is transmitted to a UE. In some cases, the DCI may include an indication of a number of CSI reports that are scheduled for an uplink slot, and may also indicate which of the number of CSI reports correspond to the particular DCI (e.g., via an index value). The UE may determine, based on the DCI, that one or more non-periodic CSI report requests have been lost, and provide an indication back to the base station that a combined CSI report lacks CSI information associated with the lost CSI report request.

A method of wireless communication is described. The method may include receiving a first CSI report request indicating that a first CSI report is to be transmitted in a first uplink slot, receiving a second CSI report request indicating that a second CSI report is to be transmitted in the first uplink slot, formatting at least a subset of one or more of the first CSI report or the second CSI report according to a formatting configuration for transmission of multiple CSI reports in a same uplink slot, and transmitting, based on the formatting, at least the subset of one or more of the first CSI report or the second CSI report in the first uplink slot.

An apparatus for wireless communication is described. The apparatus may include a processor, memory in electronic communication with the processor, and instructions stored in the memory. The instructions may be executable by the processor to cause the apparatus to receiving a first CSI report request indicating that a first CSI report is to be transmitted in a first uplink slot, receiving a second CSI report request indicating that a second CSI report is to be transmitted in the first uplink slot, formatting at least a subset of one or more of the first CSI report or the second CSI report according to a formatting configuration for transmission of multiple CSI reports in a same uplink slot, and transmitting, based on the formatting, at least the subset of one or more of the first CSI report or the second CSI report in the first uplink slot.

Another apparatus for wireless communication is described. The apparatus may include receiving a first CSI report request indicating that a first CSI report is to be transmitted in a first uplink slot, receiving a second CSI report request indicating that a second CSI report is to be transmitted in the first uplink slot, formatting at least a subset of one or more of the first CSI report or the second CSI report according to a formatting configuration for transmission of multiple CSI reports in a same uplink slot, and transmitting, based on the formatting, at least the subset of one or more of the first CSI report or the second CSI report in the first uplink slot.

A non-transitory computer-readable medium storing code for wireless communication is described. The code may include instructions executable by a processor to receiving a first CSI report request indicating that a first CSI report is to be transmitted in a first uplink slot, receiving a second CSI report request indicating that a second CSI report is to be transmitted in the first uplink slot, formatting at least a subset of one or more of the first CSI report or the second CSI report according to a formatting configuration for transmission of multiple CSI reports in a same uplink slot, and transmitting, based on the formatting, at least the subset of one or more of the first CSI report or the second CSI report in the first uplink slot.

Some examples of the method, apparatuses, and non-transitory computer-readable medium described herein may further include operations, features, means, or instructions for identifying uplink resources for transmitting at least the subset of one or more of the first CSI report or the second CSI report based on DCI associated with one or more of the first CSI report request or the second CSI report request. In some examples of the method, apparatuses, and non-transitory computer-readable medium described herein, the identifying includes identifying first uplink resources of a first component carrier (CC) based on first DCI associated with the first CSI report request and identifying second uplink resources of a second CC based on second DCI associated with the second CSI report request and the transmitting includes transmitting the first CSI report via the first uplink resources of the first CC and transmitting the second CSI report via the second uplink resources of the second CC. In some examples of the method, apparatuses, and non-transitory computer-readable medium described herein, the identifying may include operations, features, means, or instructions for identifying uplink resources of a second CC for transmitting at least a portion of both the first CSI report and the second CSI report. In some examples of the method, apparatuses, and non-transitory computer-readable medium described herein, the uplink resources of the second CC may be indicated in DCI associated with the second CSI report request. In some examples of the method, apparatuses, and non-transitory computer-readable medium described herein, the uplink resources of the second CC may be identified based on a CC index value or a serving cell index value associated with each of a first CC associated with the first CSI report request and a second CC associated with the second CSI report request. In some examples of the method, apparatuses, and non-transitory computer-readable medium described herein, the CC index value or the serving cell index value may be selected to be a minimum or a maximum index value of a set of CC index values or serving cell index values.

In some examples of the method, apparatuses, and non-transitory computer-readable medium described herein, the formatting further may include operations, features, means, or instructions for formatting other uplink control information (UCI) for transmission with at least the subset of one or more of the first CSI report or the second CSI report in the first uplink slot. In some examples of the method, apparatuses, and non-transitory computer-readable medium described herein, the other UCI includes hybrid acknowledgment receipt request (HARQ) feedback information, scheduling request (SR) information, or combinations thereof.

In some examples of the method, apparatuses, and non-transitory computer-readable medium described herein, the formatting further may include operations, features, means, or instructions for concatenating the first CSI report and the second CSI report into a single concatenated CSI report. In some examples of the method, apparatuses, and non-transitory computer-readable medium described herein, an order for concatenating the first CSI report and the second CSI report may be based on an index value of a serving cell or component carrier associated with each of the first CSI report and the second CSI report. In some examples of the method, apparatuses, and non-transitory computer-readable medium described herein, an order for concatenating the first CSI report and the second CSI report may be based on an order in which the first CSI report request and the second CSI report request may be received.

In some examples of the method, apparatuses, and non-transitory computer-readable medium described herein, for each of the first CSI report and the second CSI report, a set of fields within each CSI report may be ordered based on an associated priority level. In some examples of the method, apparatuses, and non-transitory computer-readable medium described herein, the formatting further may include operations, features, means, or instructions for identifying a set of fields within each of the first CSI report and the second CSI report, the set of fields including at least a first field and a second field and concatenating the first field of the first CSI report and the first field of the second CSI report, followed by the second field of the first CSI report and the second field of the second CSI report, followed by any other fields of the first CSI report and the second CSI report, to form a single CSI report. In some examples of the method, apparatuses, and non-transitory computer-readable medium described herein, the set of fields within each CSI report may be ordered based on an associated priority level.

In some examples of the method, apparatuses, and non-transitory computer-readable medium described herein, an order for concatenating fields across the CSI reports may be based on an index value of a serving cell or component carrier associated with each of the first CSI report and the second CSI report. In some examples of the method, apparatuses, and non-transitory computer-readable medium described herein, an order for concatenating fields across the CSI reports may be based on an order in which the first CSI report request and the second CSI report request may be received.

In some examples of the method, apparatuses, and non-transitory computer-readable medium described herein, the formatting further may include operations, features, means, or instructions for identifying at least a first portion and a second portion of each of the first CSI report and the second CSI report, where at least the second portion includes a set of fields including at least a first field and concatenating the first portion of the first CSI report and the first portion of the second CSI report, followed by a concatenation of the first field of the second portion of the first CSI report and the first field of the second portion of the second CSI report, followed by a concatenation of any other fields of the first CSI report and the second CSI report, to form a single CSI report.

In some examples of the method, apparatuses, and non-transitory computer-readable medium described herein, the first portion includes CSI part 1 report information and the second portion includes CSI part 2 information. In some examples of the method, apparatuses, and non-transitory computer-readable medium described herein, the set of fields within the second portion of each CSI report may be ordered based on an associated priority level.

In some examples of the method, apparatuses, and non-transitory computer-readable medium described herein, the formatting further may include operations, features, means, or instructions for determining that allocated uplink resources for transmission of at least the subset of one or more of the first CSI report or the second CSI report may be insufficient for transmission of all of the first CSI report and all of the second CSI report and dropping one or more fields of the set of fields of the second portion of the first CSI report and the second CSI report that extend beyond the allocated uplink resources. In some examples of the method, apparatuses, and non-transitory computer-readable medium described herein, the formatting further may include operations, features, means, or instructions for determining a processing time between receipt of the second CSI report request and the first uplink slot may be less than a threshold value and dropping the second CSI report.

Some examples of the method, apparatuses, and non-transitory computer-readable medium described herein may further include operations, features, means, or instructions for determining, based on an indication of a number of CSI reports provided with one or more of the first CSI report request or second CSI report request, that a third CSI report request for a third CSI report to be transmitted in the first uplink slot was lost and where the transmitting further includes providing an indication that the third CSI report request was lost. In some examples of the method, apparatuses, and non-transitory computer-readable medium described herein, the indication of the number of CSI reports provides a number of CSI reports scheduled for the first uplink slot and an indication of which CSI report of the number of CSI reports corresponds to the associated CSI report request and the indication that the third CSI report request was lost includes a bitmap with consecutive bits that correspond to the number of CSI reports scheduled for the first uplink slot, and a value of each bit indicates whether the corresponding CSI report may be transmitted.

A method of wireless communication is described. The method may include transmitting, to a UE, a first CSI report request indicating that a first CSI report is to be provided by the UE in a first uplink slot, transmitting, to the UE, a second CSI report request indicating that a second CSI report is to be provided by the UE in the first uplink slot, monitoring the first uplink slot for one or more CSI reports from the UE, and decoding, based on a formatting configuration for transmission of multiple CSI reports in a same uplink slot, one or more of the first CSI report or the second CSI report.

An apparatus for wireless communication is described. The apparatus may include a processor, memory in electronic communication with the processor, and instructions stored in the memory. The instructions may be executable by the processor to cause the apparatus to transmitting, to a UE, a first CSI report request indicating that a first CSI report is to be provided by the UE in a first uplink slot, transmitting, to the UE, a second CSI report request indicating that a second CSI report is to be provided by the UE in the first uplink slot, monitoring the first uplink slot for one or more CSI reports from the UE, and decoding, based on a formatting configuration for transmission of multiple CSI reports in a same uplink slot, one or more of the first CSI report or the second CSI report.

Another apparatus for wireless communication is described. The apparatus may include transmitting, to a UE, a first CSI report request indicating that a first CSI report is to be provided by the UE in a first uplink slot, transmitting, to the UE, a second CSI report request indicating that a second CSI report is to be provided by the UE in the first uplink slot, monitoring the first uplink slot for one or more CSI reports from the UE, and decoding, based on a formatting configuration for transmission of multiple CSI reports in a same uplink slot, one or more of the first CSI report or the second CSI report.

A non-transitory computer-readable medium storing code for wireless communication is described. The code may include instructions executable by a processor to transmitting, to a UE, a first CSI report request indicating that a first CSI report is to be provided by the UE in a first uplink slot, transmitting, to the UE, a second CSI report request indicating that a second CSI report is to be provided by the UE in the first uplink slot, monitoring the first uplink slot for one or more CSI reports from the UE, and decoding, based on a formatting configuration for transmission of multiple CSI reports in a same uplink slot, one or more of the first CSI report or the second CSI report. In some examples of the method, apparatuses, and non-transitory computer-readable medium described herein, the second CSI report request may have identical content to the first CSI report request.

Some examples of the method, apparatuses, and non-transitory computer-readable medium described herein may further include operations, features, means, or instructions for allocating uplink resources to the UE for transmitting the first CSI report and the second CSI report in the first uplink slot and transmitting an indication of the allocated uplink resources in part on DCI associated with one or more of the first CSI report request or the second CSI report request.

In some examples of the method, apparatuses, and non-transitory computer-readable medium described herein, the allocating includes allocating uplink resources of a second CC for transmitting at least a portion of both the first CSI report and the second CSI report and the transmitting includes transmitting the indication of the allocated uplink resources in DCI associated with the second CSI report request. In some examples of the method, apparatuses, and non-transitory computer-readable medium described herein, the uplink resources of the second CC may be selected based on a CC index value or a serving cell index value associated with each of a first CC associated with the first CSI report request and the second CC associated with the second CSI report request. Some examples of the method, apparatuses, and non-transitory computer-readable medium described herein prior allocated resources for the first CSI report provided with the first CSI report request may be re-allocated for other uplink transmissions different than the first CSI report.

In some examples of the method, apparatuses, and non-transitory computer-readable medium described herein, the formatting configuration includes a concatenation of the first CSI report and the second CSI report into a single concatenated CSI report. In some examples of the method, apparatuses, and non-transitory computer-readable medium described herein, an order in which the first CSI report and the second CSI report may be concatenated may be based on a serving cell index associated with each of the CSI reports, a CC index associated with each of the CSI reports, or an order in which the CSI report requests may be transmitted.

In some examples of the method, apparatuses, and non-transitory computer-readable medium described herein, the formatting configuration includes an order of fields within each CSI report based associated priority levels of a set of fields.

In some examples of the method, apparatuses, and non-transitory computer-readable medium described herein, the formatting configuration includes a concatenation of a first portion of each CSI report followed by concatenation per field for a set of fields across CSI reports for second portion of each CSI report. In some examples of the method, apparatuses, and non-transitory computer-readable medium described herein, the first portion includes CSI part 1 report information and the second portion includes CSI part 2 information.

In some examples of the method, apparatuses, and non-transitory computer-readable medium described herein, one or more of the first CSI report request or second CSI report requests includes an indication of a number of CSI reports that may be scheduled for transmission in the first uplink slot and an index value of the corresponding CSI report request within the number of CSI reports that may be scheduled for transmission in the first uplink slot. In some examples of the method, apparatuses, and non-transitory computer-readable medium described herein, the decoding further may include operations, features, means, or instructions for identifying a bitmap provided with the one or more CSI reports with consecutive bits that correspond to the number of CSI reports scheduled for the first uplink slot, and a value of each bit indicates whether the corresponding CSI report may be included with the one or more CSI reports.

A method of wireless communication is described. The method may include receiving a first CSI report request indicating that a first CSI report is to be transmitted in a first uplink slot, and a second CSI report request indicating that a second CSI report is to be transmitted in the first uplink slot, disregarding the first CSI report request based on receiving the second CSI report request, and transmitting the second CSI report in the first uplink slot.

An apparatus for wireless communication is described. The apparatus may include a processor, memory in electronic communication with the processor, and instructions stored in the memory. The instructions may be executable by the processor to cause the apparatus to receiving a first CSI report request indicating that a first CSI report is to be transmitted in a first uplink slot, and a second CSI report request indicating that a second CSI report is to be transmitted in the first uplink slot, disregarding the first CSI report request based on receiving the second CSI report request, and transmitting the second CSI report in the first uplink slot.

Another apparatus for wireless communication is described. The apparatus may include receiving a first CSI report request indicating that a first CSI report is to be transmitted in a first uplink slot, and a second CSI report request indicating that a second CSI report is to be transmitted in the first uplink slot, disregarding the first CSI report request based on receiving the second CSI report request, and transmitting the second CSI report in the first uplink slot.

A non-transitory computer-readable medium storing code for wireless communication is described. The code may include instructions executable by a processor to receiving a first CSI report request indicating that a first CSI report is to be transmitted in a first uplink slot, and a second CSI report request indicating that a second CSI report is to be transmitted in the first uplink slot, disregarding the first CSI report request based on receiving the second CSI report request, and transmitting the second CSI report in the first uplink slot.

In some examples of the method, apparatuses, and non-transitory computer-readable medium described herein, the first CSI report request may be received earlier in time than the second CSI report request, and the disregarding may be based on the earlier received CSI report request. In some examples of the method, apparatuses, and non-transitory computer-readable medium described herein, the first CSI report request may be received later in time than the second CSI report request, and where a processing time between receipt of the first CSI report request and the first uplink slot may be determined to be less than a threshold value, and where the disregarding may be based on the determination. In some examples of the method, apparatuses, and non-transitory computer-readable medium described herein, the disregarding may be based on a serving cell index associated with each of the CSI reports, a CC index associated with each of the CSI reports, or an order in which the CSI report requests may be transmitted.

A method of wireless communication is described. The method may include transmitting, to a UE, a first CSI report request indicating that a first CSI report is to be provided by the UE in a first uplink slot, determining that a second CSI report request is to be transmitted to the UE, scheduling, based on the determining, an uplink slot for transmission of a second CSI report from the UE, where the scheduling includes refraining from scheduling the second CSI report in the first uplink slot or scheduling the second CSI report to be transmitted instead of the first CSI report in the first uplink slot, transmitting, based on the scheduling, the second CSI report request to the UE, and receiving, based on the scheduling, the first CSI report or the second CSI report in the first uplink slot.

An apparatus for wireless communication is described. The apparatus may include a processor, memory in electronic communication with the processor, and instructions stored in the memory. The instructions may be executable by the processor to cause the apparatus to transmitting, to a UE, a first CSI report request indicating that a first CSI report is to be provided by the UE in a first uplink slot, determining that a second CSI report request is to be transmitted to the UE, scheduling, based on the determining, an uplink slot for transmission of a second CSI report from the UE, where the scheduling includes refraining from scheduling the second CSI report in the first uplink slot or scheduling the second CSI report to be transmitted instead of the first CSI report in the first uplink slot, transmitting, based on the scheduling, the second CSI report request to the UE, and receiving, based on the scheduling, the first CSI report or the second CSI report in the first uplink slot.

Another apparatus for wireless communication is described. The apparatus may include transmitting, to a UE, a first CSI report request indicating that a first CSI report is to be provided by the UE in a first uplink slot, determining that a second CSI report request is to be transmitted to the UE, scheduling, based on the determining, an uplink slot for transmission of a second CSI report from the UE, where the scheduling includes refraining from scheduling the second CSI report in the first uplink slot or scheduling the second CSI report to be transmitted instead of the first CSI report in the first uplink slot, transmitting, based on the scheduling, the second CSI report request to the UE, and receiving, based on the scheduling, the first CSI report or the second CSI report in the first uplink slot.

A non-transitory computer-readable medium storing code for wireless communication is described. The code may include instructions executable by a processor to transmitting, to a UE, a first CSI report request indicating that a first CSI report is to be provided by the UE in a first uplink slot, determining that a second CSI report request is to be transmitted to the UE, scheduling, based on the determining, an uplink slot for transmission of a second CSI report from the UE, where the scheduling includes refraining from scheduling the second CSI report in the first uplink slot or scheduling the second CSI report to be transmitted instead of the first CSI report in the first uplink slot, transmitting, based on the scheduling, the second CSI report request to the UE, and receiving, based on the scheduling, the first CSI report or the second CSI report in the first uplink slot.

In some examples of the method, apparatuses, and non-transitory computer-readable medium described herein, the UE may be configured to transmit only a single CSI report in one uplink slot.

DETAILED DESCRIPTION

Figure 1:
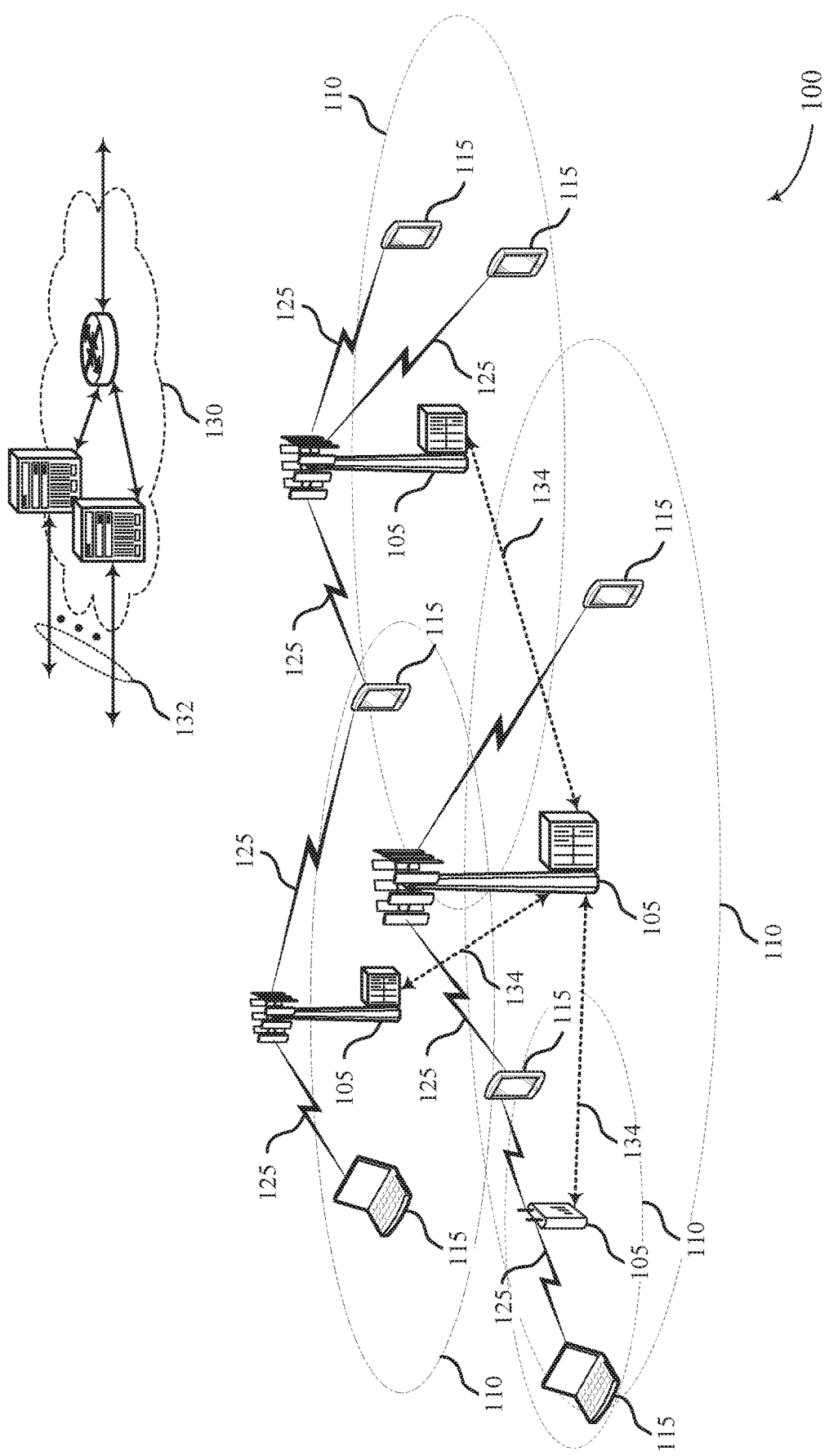
FIG. 1 illustrates an example of a wireless communications system that supports non-periodic channel state information triggering and reporting in wireless communications in accordance with aspects of the present disclosure.

Various techniques provided herein are directed to channel state information (CSI) reporting when multiple CSI reports requested in a same uplink slot. As indicated above, in some wireless communication systems CSI reporting may be used to enhance the reliability of a communications link. For example, a UE may generate a CSI report based on channel conditions observed by the UE (e.g., based on a signal to noise ratio (SNR) of a CSI reference signal (CSI-RS) transmitted by a base station), and transmit the CSI report to the base station. In some cases, the base station may modify transmission parameters for a subsequent transmission to the UE based on the information received in the CSI report. In some cases, a base station may request non-periodic CSI reports, such as aperiodic CSI (A-CSI) reports or semi-persistent CSI (SP-CSI) reports, and a UE may generate one or more CSI reports based on the non-periodic CSI report requests. In some cases, a base station may request a CSI report for multiple component carriers (CCs) that may be configured at a UE. However, multiple CSI report requests and CSI report transmissions may present challenges for UEs to transmit such CSI reports. For example, sufficient uplink resources may not be available for transmission of full CSI reports for different CCs within a same uplink slot. Furthermore, encoding and transmission of multiple CSI reports in a same uplink slot may require additional encoders and processing resources than transmission of one CSI report.

In some aspects of the present disclosure, techniques for handling CSI report requests that trigger uplink CSI report transmission in a same slot may provide UEs and base stations with capabilities for such CSI report requests and thereby enhance network efficiency, reliability, and flexibility. In some cases, a base station may transmit a first CSI report request and provide uplink resources in a first uplink slot for transmission of an associated first CSI report, followed by a transmission of a second CSI report request with associated uplink resources in the first uplink slot for transmission of an associated second CSI report. In some cases, a UE receiving such CSI report requests may format at least a subset of the multiple CSI reports according to a formatting configuration for transmission of multiple CSI reports in a same uplink slot. In some cases, the UE may use allocated resources in the uplink slot for each CSI report that are allocated by the base station in the corresponding CSI report request. In other cases, the UE may combine the multiple CSI reports, or parts thereof, into a combined CSI report that may be transmitted using allocated resources of one of the CSI report requests. In some cases, one or more portions of the multiple CSI reports may be concatenated and transmitted to the base station. In cases where uplink resources to transmit the combined reports exceed allocated uplink resources, one or more portions of one or more of the CSI reports may be dropped in accordance with defined dropping rules. In further cases, the UE may select one of the CSI report requests and disregard one or more other CSI report requests, and transmit the corresponding CSI report.

In some cases, a base station may provide a non-periodic CSI report request in downlink control information (DCI) that is transmitted to a UE. In some cases, the DCI may include an indication of a number of CSI reports that are scheduled for an uplink slot, and may also indicate which of the number of CSI reports correspond to the particular DCI. In some examples, the DCI may include a first counter that indicates the number of scheduled CSI reports and a second counter that provides an index value that indicates which CSI report within the scheduled CSI reports corresponds to the DCI. The UE may determine, based on the DCI, that another DCI that contained a non-periodic CSI report request was lost. For example, the number of CSI reports indicated in the DCI may be greater than a number of CSI report requests that the UE has received, which may indicate to the UE that another DCI was lost (e.g., that another DCI was not successfully received and decoded by the UE). Further, the UE may determine, based on the index values of one or more successfully received CSI report requests, which CSI report request was lost. The UE may, based on the determinations, provide an indication that a combined CSI report lacks CSI information associated with the lost DCI. In some cases, the UE may provide a bitmap having separate bits associated with each scheduled CSI report that indicates whether the associated CSI report is included in a combined CSI report. The base station may use such a bitmap to properly decode the combined CSI report.

Aspects of the disclosure are initially described in the context of a wireless communications system. Various techniques for treatment of CSI report requests that trigger a CSI report transmission in a same uplink slot are then discussed. Aspects of the disclosure are further illustrated by and described with reference to apparatus diagrams, system diagrams, and flowcharts that relate to non-periodic channel state information triggering and reporting in wireless communications.

FIG. 1 illustrates an example of a wireless communications system 100 that supports non-periodic channel state information triggering and reporting in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, base stations 105 may transmit non-periodic CSI report requests to one or more UEs that may trigger multiple CSI report transmissions in a same uplink slot, and one or more of the CSI reports may be transmitted in the uplink slot in accordance with the techniques as discussed herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

In some cases, a base station 105 may transmit a CSI report request to a UE 115. Such a CSI report request may be for CSI measurements made at the UE 115 for a particular serving cell or CC, and may allow the base station 105 to make one or more modifications to transmission parameters for a subsequent transmission to the UE 115 based on the information received in the CSI report. In some cases, periodic CSI reports may be configured in which the base station 105 may transmit a CSI-RS and a UE 115 may perform measurements and transmit the CSI report using configured periodic uplink resources. In other cases, however, non-periodic CSI reports may be requested by a base station 105, such as A-CSI or SP-CSI reports. In such cases, a CSI report request may be transmitted by a base station 105 that triggers a CSI report that is provided by a UE 115 via an uplink subframe indicated by the CSI report request. In cases where multiple CSI report requests trigger transmission of multiple CSI reports in a same uplink slot, various techniques discussed herein provide for efficient handling of such CSI reports.

Figure 2:
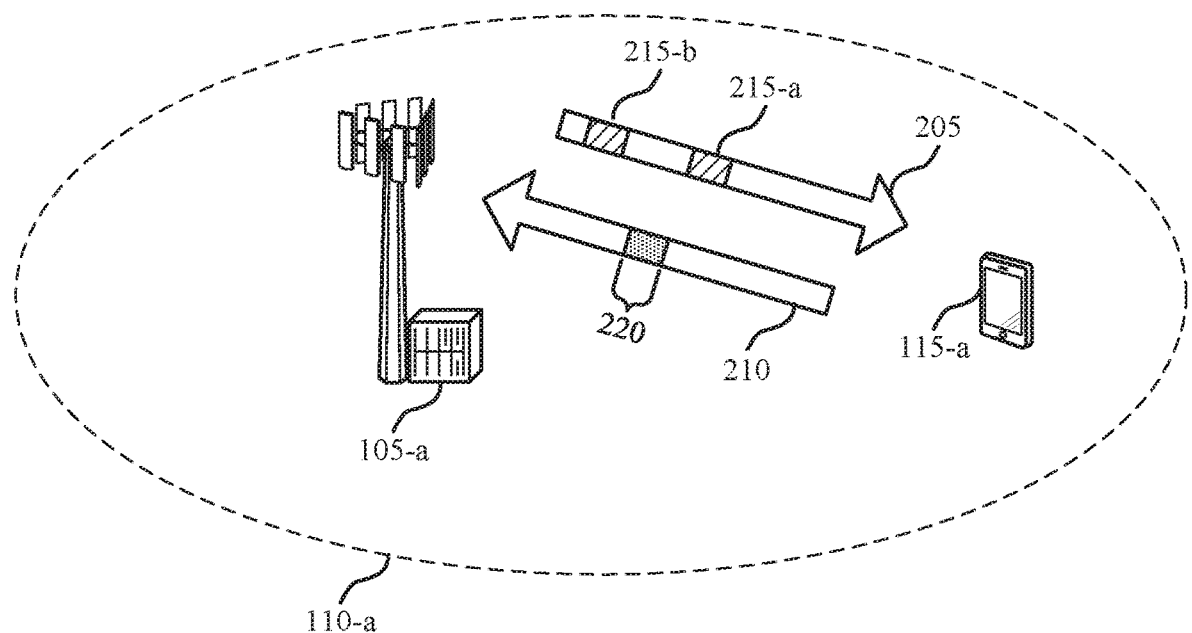
FIG. 2 illustrates an example of a wireless communication system that supports non-periodic channel state information triggering and reporting in wireless communications in accordance with aspects of the present disclosure.

FIG. 2 illustrates an example of a wireless communication system 200 that supports non-periodic channel state information triggering and reporting in wireless communications in accordance with aspects of the present disclosure. In some examples, wireless communication system 200 may implement aspects of wireless communication system 100. In some examples, the wireless communication system 200 may include a base station 105-*a* and UE 115-*a*, which may be examples of the corresponding devices as described with reference to FIG. 1. UE 115-*a* may communicate with the base station 105-*a* within a coverage area 110-*a*.

In some examples, the base station 105-*a* may transmit downlink transmissions 205 to the UE 115-*a*, and UE 115-*a* may transmit uplink transmissions 210 to the base station. The downlink transmissions 205 and uplink transmissions 210 may be made via one or more CCs. In the example of FIG. 2, the base station 105-*a* may transmit CSI report requests 215 to the UE 115-*a*. The CSI report requests 215 may include a first CSI report request 215-*a*, which may be transmitted in a first downlink slot and request a first CSI report for a first CC. The CSI report requests 215 may include a second CSI report request 215-*b*, which may be transmitted in a second downlink slot that is different than the first downlink slot and request a second CSI report for a second CC. In some cases, both the first CSI report and the second CSI report may be requested to be transmitted in a same uplink slot. The UE 115-*a*, upon receiving the CSI report requests 215, may format and transmit a CSI report 220 to the base station 105-*a*.

In some cases, the UE 115-*a* may disregard the earlier-received CSI report request 215 and format and transmit the CSI report 220 in accordance with the later-received CSI report request. In other cases, the UE 115-*a* may format the CSI report 220 to include both a first CSI report responsive to the first CSI report request 215-*a*, and a second CSI report responsive to the second CSI report request 215-*b*. In some cases, the first CSI report and second CSI report may be transmitted in the same uplink slot using separate uplink resources associated with the first CSI report request 215-*a* and the second CSI report request 215-*b*. Such transmission of separate CSI reports may result in the UE 115-*a* performing separate encoding for the separate CSI reports, which may reduce encoding gain at the UE 115-*a*. In other cases, the UE 115-*a* may format the CSI report 220 to be a combined report that is responsive to both the first CSI report request 215-*a* and the second CSI report request 215-*b*. Such a combined CSI report 220 may be transmitted via one physical uplink shared channel (PUSCH) on one single CC. Various techniques for generating and transmitting a combined report, as well as for identifying one or more missing CSI report requests, are discussed in more detail below with reference to FIGS. 3 and 4.

Figure 3:
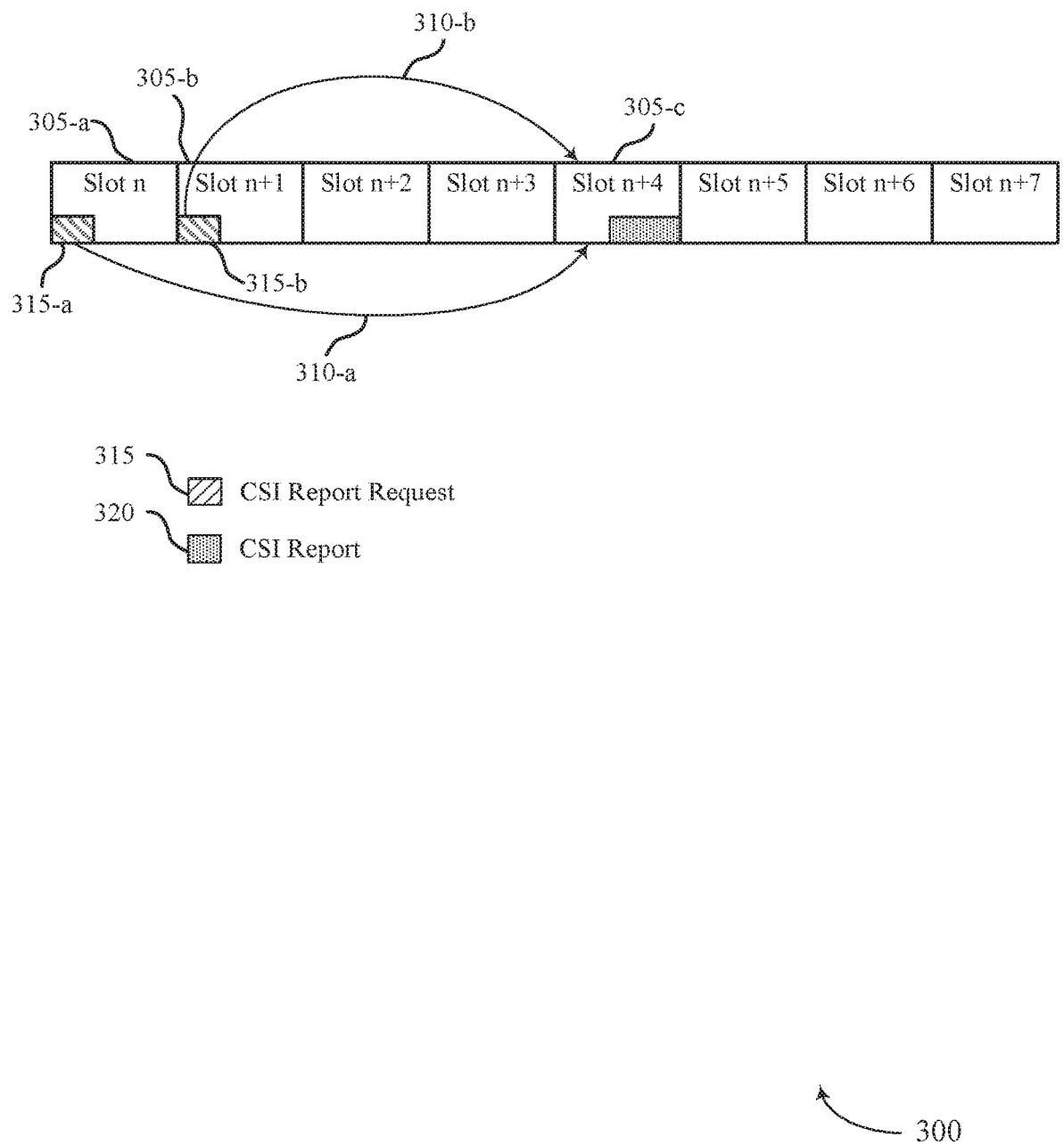
FIG. 3 illustrates an example of a CSI report request and transmission slots that supports non-periodic channel state information triggering and reporting in wireless communications in accordance with aspects of the present disclosure.

FIG. 3 illustrates an example of CSI report request and transmission slots 300 that support non-periodic channel state information triggering and reporting in wireless communications in accordance with aspects of the present disclosure. In some examples, CSI report request and transmission slots 300 may implement aspects of wireless communication system 100. In the example of FIG. 3, a number of slots 305 may be used for transmission between a UE and a base station (e.g., between UEs 115 and base stations 105 as described with respect to FIGS. 1 and 2). A first slot 305-*a* (slot n) may include a first CSI report request 315-*a* (e.g., via downlink control information (DCI) that triggers a CSI report on a first CC or first serving cell), and a second slot 305-*b* (slot n+1) may include a second CSI report request 315-*b* (e.g., via DCI that triggers a CSI report on a second CC or second serving cell), each of which may be non-periodic CSI requests. In some cases, the CSI report requests 315 may be A-CSI report requests that both have information 310 that triggers a CSI report 320 to be transmitted in a third slot 305-*c* (slot n+4). In other cases, the CSI report requests 315 may be SP-CSI requests, where the two SP-CSI configurations (e.g., same periodicity, different offset) map to the third slot 305-*c*.

In some cases, a UE may not be expected to receive more than one non-periodic CSI report request in a given slot, but a base station may be permitted to schedule multiple non-periodic report requests different slots (e.g., in back-to-back slots such as illustrated in FIG. 3), and those requests may trigger non-periodic CSI reports in the same slot (e.g., in a third slot 305-*a* as illustrated in FIG. 3). As mentioned above, in some cases, a UE receiving such CSI report requests 315 may transmit a combined report using a PUSCH associated with one of the CSI report requests. In some cases, the base station may allocate more resources in a second downlink control information (DCI) transmission associated with the second CSI report request 315-*b*, because the base station is aware that the UE is to convey both CSI reports in the resources assigned in the second DCI.

In some examples, the base station may recycle allocated resources provided in a first DCI with the first CSI report request 315-*a* for other purposes. In such cases, when the UE sees the uplink resources provided with the first CSI report request 315-*a* reassigned to other uplink transmissions in later DCI, the UE can be aware of the resource recycling and follow later UCI resource allocation. For example, the first CSI report request 315-*a* may signal a non-periodic CSI report only, without uplink shared channel data (UL-SCH), to be transmitted on a first CC using a resource block (RB) allocation of RBs 0-2. The base station, when allocating resources indicated in the second CSI report request 315-*b* may allocate, based at least in part on the first CSI report request 315-*a*, uplink resources without UL-SCH on a second CC using RBs 0-10, and the prior allocation of RB 0-2 on the first CC may be recycled at the base station and signaled in another DCI as being allocated for PUSCH transmissions.

The UE, upon receipt of multiple CSI report requests for multiple CSI reports in a same uplink slot may, in some cases, simply follow the scheduling provided in the associated DCI for each CSI report request, and multiplex the CSI reports on PUSCHs on different CCs. Continuing with the above example, in such case the UE may multiplex the first CSI report on PUSCH on the first CC, and multiplex the second CSI report on PUSCH on the second CC. Such transmissions of multiple CSI reports may result in the UE using separate CSI encoding, which may reduce encoding gain and requires more encoders at the UE. Such separate CSI report transmissions, in some cases, may be configured and selected by a base station based on a UE capability.

In other cases, the UE may combine the multiple CSI reports into one CSI combined report, and multiplex the combined report on one PUSCH on one single CC. In some cases, the CC that is selected for the uplink CSI report transmission may be determined based on the PUSCH scheduled by the latest received DCI (e.g., the DCI received with the second CSI report request 315-*b* in the example of FIG. 3). In other cases, the UE may select the one PUSCH as the PUSCH allocated on the smallest or largest serving cell index or CC index among all the CCs have PUSCH to transmit. In some cases, if the UE has other uplink control information (UCI) to transmit besides the CSI reports (e.g., HARQ ACK/NACK feedback, scheduling request (SR) information, or combinations thereof), the other UCI may also be multiplexed on the one PUSCH on the one single CC (e.g., that may be selected according to either of the techniques discussed above).

In some cases, the DCI that provides each non-periodic CSI report request may include an indication of a number of CSI reports that are scheduled for an uplink slot, and may also indicate which of the number of CSI reports correspond to the particular DCI. The UE may use such information to determine whether a CSI report request was lost, and provide feedback to the base station that the report was lost. The UE in such cases may provide a combined CSI report that does not include CSI for the lost CSI report request, and thus the base station may expect a combined CSI report that includes a different number of CSI reports than the UE transmits. Such feedback information to the base station may allow the base station to have an understanding of the number of non-periodic CSI reports provided by the UE in the uplink slot, as well as which CSI reports are present or missing in the combined CSI report.

For example, the base station may transmit three non-periodic CSI report requests via three DCIs (e.g., CSI report request 1 transmitted at slot n, CSI report request 2 sent at slot n+1, and CSI report request 3 sent at slot n+2). All three requests may trigger non-periodic CSI feedback on slot n+4. However, on the UE side, the second CSI report request may be lost because of a DCI decoding failure. Thus, the UE will provide two CSI reports, while the base station is expecting three CSI reports. The indications provided by the base station in the DCI, and the feedback provided by the UE, may allow for proper decoding and reading of the CSI provided by the UE in the event that one or more DCI transmissions are lost. In some cases, the base station may provide two CSI report counter fields in DCI. In such cases, two counters may be introduced, in which a first counter (e.g., a "Total A-CSI reports" counter) may indicate how many CSI reports are scheduled by the base station up to the current slot, and a second counter (e.g., a "Counter A-CSI reports" counter) may indicate which CSI report (e.g., in terms of indexing) within the number of scheduled CSI reports corresponds to the CSI request in the associated DCI.

The UE, based on the first counter, may determine out how many non-periodic CSI reports (e.g., K) it is to report (before concatenation into a combined report). In such cases, the UE may generate a length K bitmap. The UE may then, based on the second counter, determine which requests of the K requests are received and which are missing. The UE may thus determine the value of each bit in the length K bitmap. For those CSI report requests that have been lost, nothing is reported in the combined CSI report. The length K bitmap may be provided as feedback to the base station that indicates which CSI reports are included and which CSI reports are missing in the combined CSI report. In some cases, the UE feedback (e.g., the length K bitmap) may be provided at the beginning of the combined CSI report. In other cases, the UE feedback may be provided in separate dedicated resources in the uplink transmission. Thus, the UE may indicate to the base station how the combined CSI report is to be interpreted.

In other cases, the UE may not be expected to receive multiple DCI triggering multiple CSI reports for transmission in the same slot, and the UE may treat such multiple CSI report triggers as an error. In some cases, the UE may disregard the CSI report request that is received later in time. In other cases, the UE may disregard the CSI report that is received later in time, and in such cases the base station may recognize that the first CSI report request will be disregarded and may recycle the associated uplink resources.

In cases where multiple CSI reports are combined, the UE may format the combined CSI report to provide each of the multiple CSI reports using the one PUSCH on the one single CC. Such techniques may allow the UE to use a single encoder and may use less processing resources than separate encoding of multiple CSI reports. In some cases, two or more CSI reports may be combined by concatenating the multiple CSI reports together (e.g., report 1 field 1, report 1 field 2, ..., report 1 field N, report 2 field 1, report 2 field 2, ..., report 2 field M, ... ). In some cases, the ordering of the multiple concatenated CSI reports may be based on a serving cell index, a CC index, or an ordering of received DCI of the associated CSI report. In some cases, the ordering of fields in each CSI report may follow a priority level associated with each CSI report field (e.g. wideband CSI information has higher priority than narrowband CSI information).

In other cases, two or more CSI reports may be combined by concatenating the reports per field type across the multiple CSI reports (e.g., report 1 field 1, report 2 field 1, ..., report K field 1, report 1 field 2, report 2 field 2, ..., report k field 2, report 1 field 3, report 2 field 3, ..., report k field 3, ... ). In such cases, the order of fields in the combined report may the priority level associated with each CSI report field (e.g. wideband CSI information has higher priority than narrowband CSI information). In some cases, for each field i of the combined CSI report, the ordering of report can be based on serving cell index, CC index, or based on ordering of received DCI of the associated CSI report. Additionally, in some cases, the fields within a single CSI report can be ordered based on priority level (e.g., wideband CSI information may have higher priority than narrow band CSI information). In some cases, portions of CSI reports may be concatenated at a CSI report-level, and other portions of CSI reports may be concatenated at a field-level. Examples of such techniques are described with respect to FIG. 4.

Figure 4:
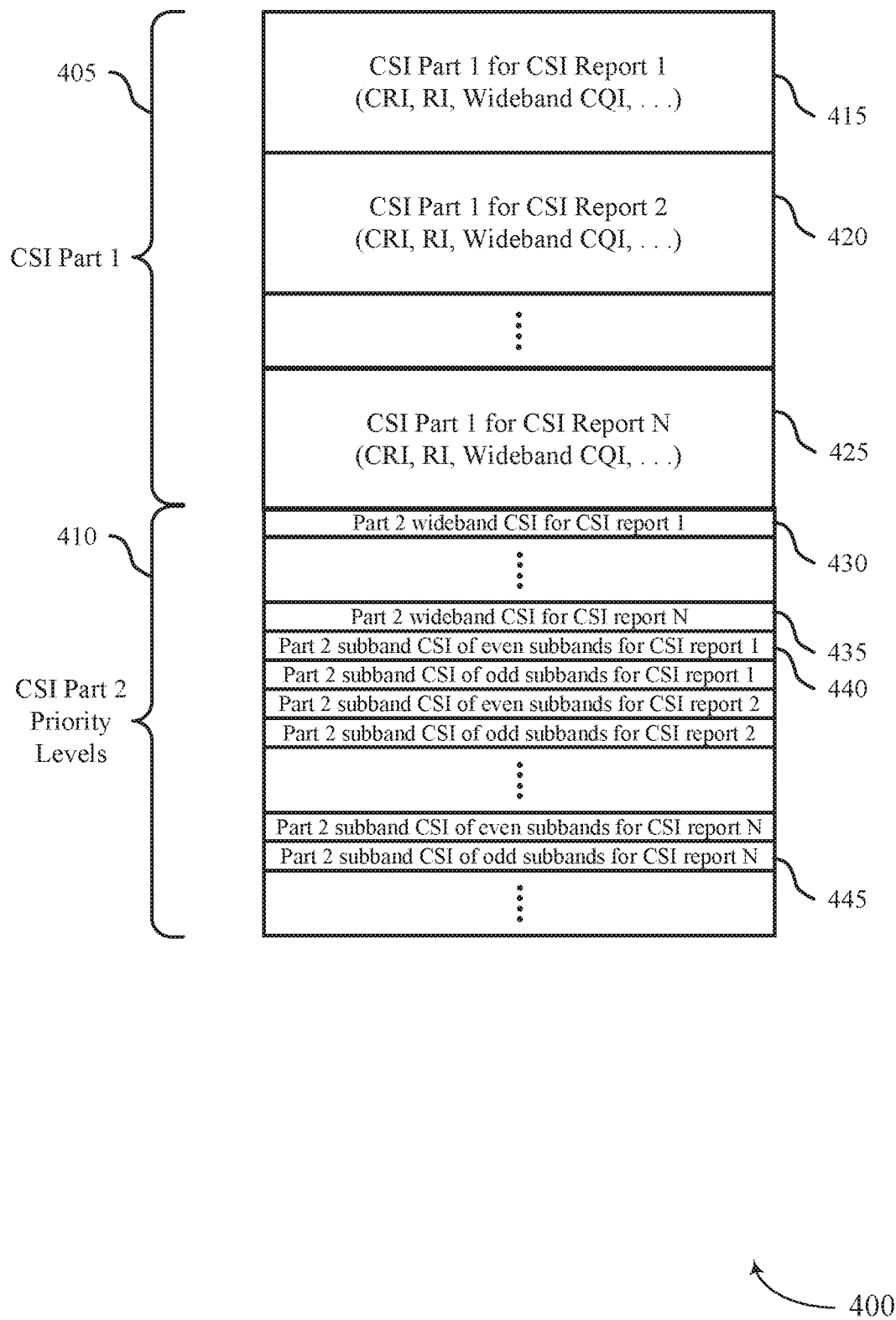
FIG. 4 illustrates an example of a CSI report that supports non-periodic channel state information triggering and reporting in wireless communications in accordance with aspects of the present disclosure.

FIG. 4 illustrates an example of a combined CSI report 400 that supports non-periodic channel state information triggering and reporting in wireless communications in accordance with aspects of the present disclosure. In some examples, combined CSI report 400 may implement aspects of wireless communication system 100. In this example, multiple CSI reports may be transmitted by a UE responsive to multiple CSI report requests using a single PUSCH on an single CC.

In this example, each CSI report may be partitioned into two or more portions. A first portion 405 in the example of FIG. 4 may correspond to CSI part 1 information for each CSI report, and a second portion 410 may correspond to CSI part 2 information for each CSI report. In some cases, the first portion 405 of the CSI reports may be concatenated at a CSI report-level, and the second portion 410 of the CSI reports may be concatenated at a field-level. Thus, in this example, the combined CSI report 400 may include a first field 415 that includes CSI part one information for a first CSI report. The CSI part one information for the first CSI report may include a number of CSI part one information fields (e.g., such as CRI, RI, wideband CQI), and an example of such CSI part one information is included below at Table 1. The first field 415 may be followed by one or more other fields 420 through 425, that include CSI part one information for one or more subsequent CSI reports. In some cases, the ordering of the CSI part one information for CSI reports in the first portion 405 may be determined based on serving cell index, a CC index, or an ordering of received DCI of the associated CSI report.

Following the first portion 405, in this example, different portions of CSI part 2 information may be concatenated and included in the combined CSI report 400. In this example, part 2 wideband CSI information 430 for the first CSI report may be followed by other part 2 wideband CSI for other CSI reports through a last CSI report 435. The CSI part 2 wideband information may include a number of CSI part 2 wideband information fields, and an example of such CSI part 2 wideband information is included below at Table 2. In this example, following the CSI part 2 wideband information, CSI part 2 subband information 440 through 445 may be provided for the multiple CSI reports. The CSI part 2 subband information may include a number of CSI part 2 subband information fields, and an example of such CSI part 2 subband information is included below at Table 3.

In some cases, uplink resources for transmission of the combined CSI report 400 may not be sufficient for transmission of all of the fields of the combined CSI report. In such cases, a UE may drop one or more fields in the second portion 410 (e.g., starting at field 445 and working upward toward wideband CSI information 430) until the combined CSI report 400 can be transmitted using the allocated uplink resources.

In some cases, if a time difference between a CSI report request and the uplink slot for transmission of the corresponding CSI report is below a threshold value that is associated with a processing time requirement at the UE, the CSI report may be dropped entirely form the combined CSI report 400.

TABLE 1

Mapping order of CSI fields of one CSI report, CSI part 1

| CSI report number | CSI fields |
|---|---|
| CSI report #n CSI part 1 | CRI or SSB index, if reported<br>Rank Indicator, if reported<br>Layer Indicator, if reported<br>Wideband CQI, if reported<br>Subband differential CQI for the first TB, if reported<br>Indicator of the number of non-zero wideband amplitude coefficients $M_l$ for layer $l$, if reported<br>RSRP, if reported<br>Differential RSRP, if reported |

TABLE 2

Mapping order of CSI fields of one CSI report, CSI part 2 wideband

| CSI report number | CSI fields |
|---|---|
| CSI report #n CSI part 2 wideband | Wideband CQI for the second TB, if present and reported<br>PMI wideband information fields, if reported<br>PMI wideband/partial band information fields, if reported |

TABLE 3

Mapping order of CSI fields of one CSI report, CSI part 2 subband

| CSI report number | CSI fields |
|---|---|
| CSI report #n Part 2 subband | Subband differential CQI for the second TB of all even subbands with increasing order of subband number, if reported<br>PMI subband information fields $X_2$ of all even subbands with increasing order of subband number, if reported<br>Subband differential CQI for the second TB of all odd subbands with increasing order of subband number, if reported<br>PMI subband information fields $X_2$ of all odd subbands with increasing order of subband number, if reported |

Figure 5:
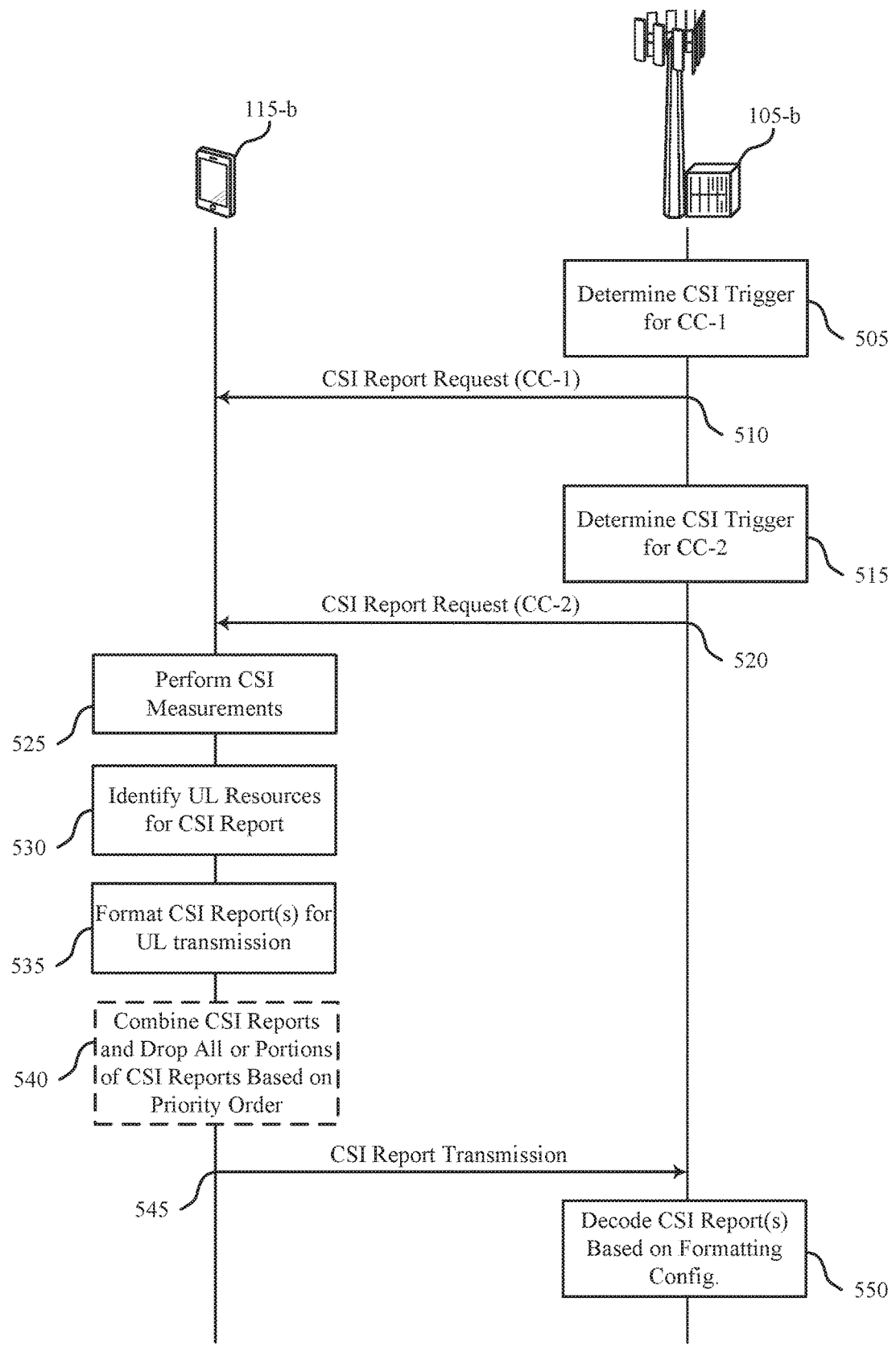
FIG. 5 illustrates an example of a process flow that supports non-periodic channel state information triggering and reporting in wireless communications in accordance with aspects of the present disclosure.

FIG. 5 illustrates an example of a process flow 500 that supports non-periodic channel state information triggering and reporting in wireless communications in accordance with aspects of the present disclosure. In some examples, process flow 500 may implement aspects of wireless communication system 100. In this example, process flow 500 includes UE 115-*b* and base station 105-*b*, which may examples of the corresponding devices described with reference to FIGS. 1 and 2.

At 505, the base station 105-*b* determine that a first non-periodic CSI trigger is to be transmitted for a first CC, to trigger the UE 115-*b* to transmit a first non-periodic CSI report for the first CC. In some cases, such a determination may be made based on a time since a prior CSI report of the first CC, or a measured channel condition (e.g., RSRP of the first CC, an error rate associated with the first CC, etc.), for example. The base station 105-*b* may format first DCI that includes a first CSI report request for the first CC, and that may also allocate uplink resources in a first slot for an uplink transmission of the associated first CSI report. The base station 105-*b* may transmit the CSI report request 510 to the UE 115-*b*, in the first DCI.

At 515, the base station 105-*b* determine that a second non-periodic CSI trigger is to be transmitted for a second CC, to trigger the UE 115-*b* to transmit a second non-periodic CSI report for the second CC. The base station 105-*b* may format second DCI that includes a second CSI report request for the second CC, and that may also allocate uplink resources in the first slot for an uplink transmission of the associated second CSI report. The base station 105-*b* may transmit the second CSI report request 520 to the UE 115-*b*, in the second DCI.

At 525, the UE 115-*b* may receive the CSI report requests, and may perform CSI measurements. In some cases, the CSI measurements may include one or more channel quality measurements of a CSI-RS that is transmitted via each CC by the base station 105-*a*.

At 530, the UE 115-*b* may identify uplink resources for transmitting a CSI report responsive to one or both of the CSI report requests. In some cases, the UE 115-*b* may disregard one of the CSI report requests. In some cases, the UE 115-*b* may identify uplink resources based on a serving cell index, a CC index, or a latest received CSI report request. In some cases, the uplink resources of an earlier-received CSI report request may be recycled by the base station 105-*b* and reused for other uplink transmissions.

At 535, the UE 115-*b* may format one or more CSI reports for uplink transmission to the base station 105-*b*. In some cases, the UE 115-*b* may disregard one or more of the CSI report requests, and may format one or more remaining CSI reports for uplink transmission. In some cases, the UE 115-*b* may disregard a CSI report request based on a time between the request and an uplink slot being less than a threshold value. In some cases, the UE 115-*b* may disregard a CSI report request that schedules the CSI report in a same uplink slot as another CSI report, and may select a CSI report to transmit based on an earlier or later received CSI report request. In some cases, the base station 105-*b*, upon transmitting a CSI report request, may refrain from scheduling another CSI report in a same uplink slot as an earlier configured report, or may schedule the second CSI report to be transmitted instead of the first CSI report in the first uplink slot. In some cases, the UE 115-*b* may format the CSI reports to be a combined CSI report.

At 540, the UE 115-*b* may optionally, when a combined CSI report is formatted, combine CSI reports and drop all or portions of one or more CSI reports based on a priority order. In some cases, the UE 115-*b* may concatenate the multiple CSI reports together, may concatenate different fields of the multiple CSI reports together, or may concatenate first portions of the CSI reports together followed by concatenation of fields of the multiple CSI reports. In some cases, if uplink resources are insufficient for transmission of an entire combined CSI report, portions of the report may be dropped in accordance with a configured priority order.

The UE 115-*b* may then transmit the CSI report 545 to the base station 105-*b*. At 550, the base station 105-*b* may decode the CSI report(s) based on the configured formatting of the CSI reports.

Figure 6:
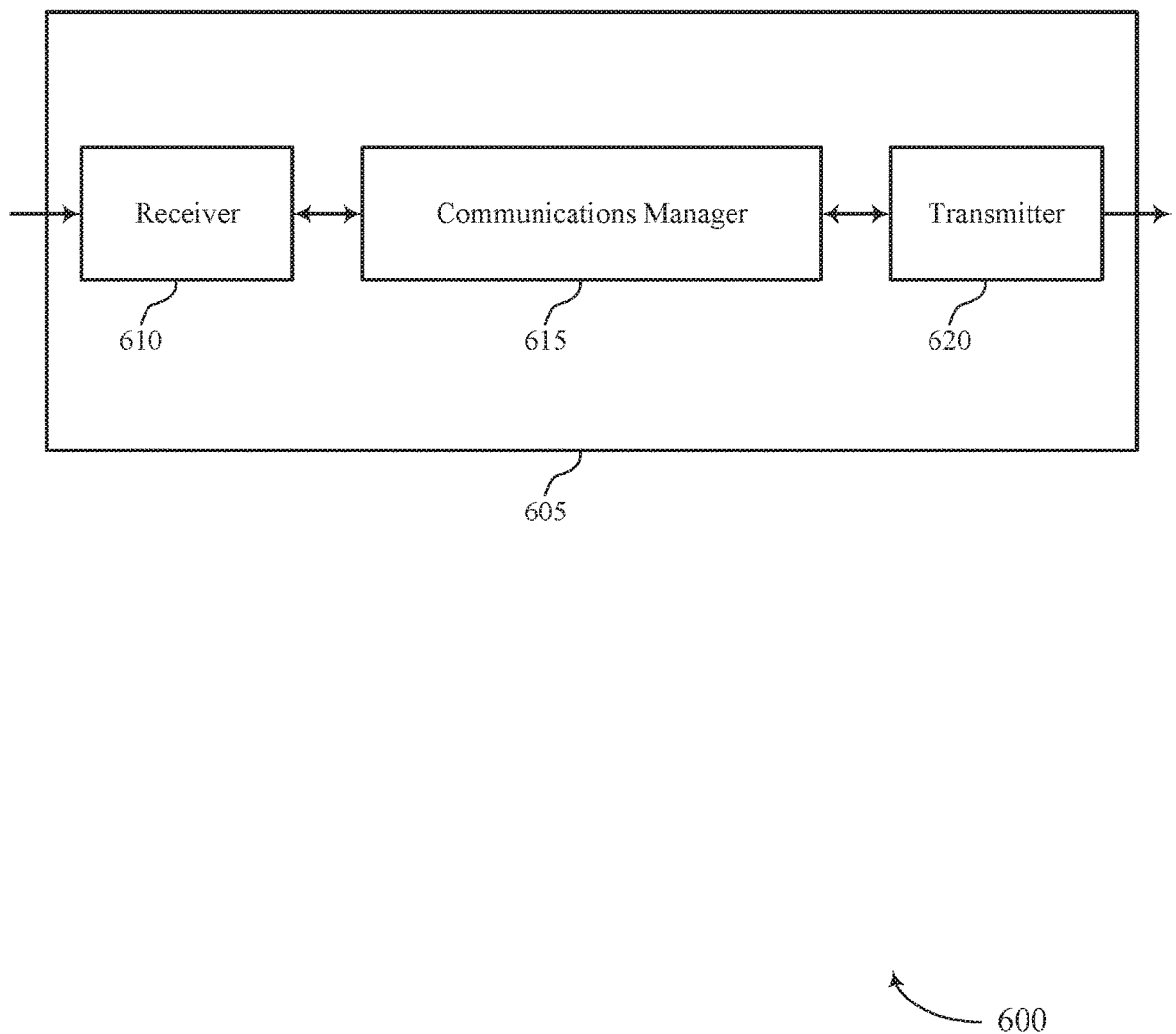
FIGS. 6 and 7 show block diagrams of devices that support non-periodic channel state information triggering and reporting in wireless communications in accordance with aspects of the present disclosure.

FIG. 6 shows a block diagram 600 of a device 605 that supports non-periodic channel state information triggering and reporting in wireless communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to non-periodic channel state information triggering and reporting in wireless communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a first CSI report request indicating that a first CSI report is to be transmitted in a first uplink slot, receive a second CSI report request indicating that a second CSI report is to be transmitted in the first uplink slot, format at least a subset of one or more of the first CSI report or the second CSI report according to a formatting configuration for transmission of multiple CSI reports in a same uplink slot, and transmit, based on the formatting, at least the subset of one or more of the first CSI report or the second CSI report in the first uplink slot.

The communications manager 615 may also receive a first CSI report request indicating that a first CSI report is to be transmitted in a first uplink slot, and a second CSI report request indicating that a second CSI report is to be transmitted in the first uplink slot, disregard the first CSI report request based on receiving the second CSI report request, and transmit the second CSI report in the first uplink slot. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
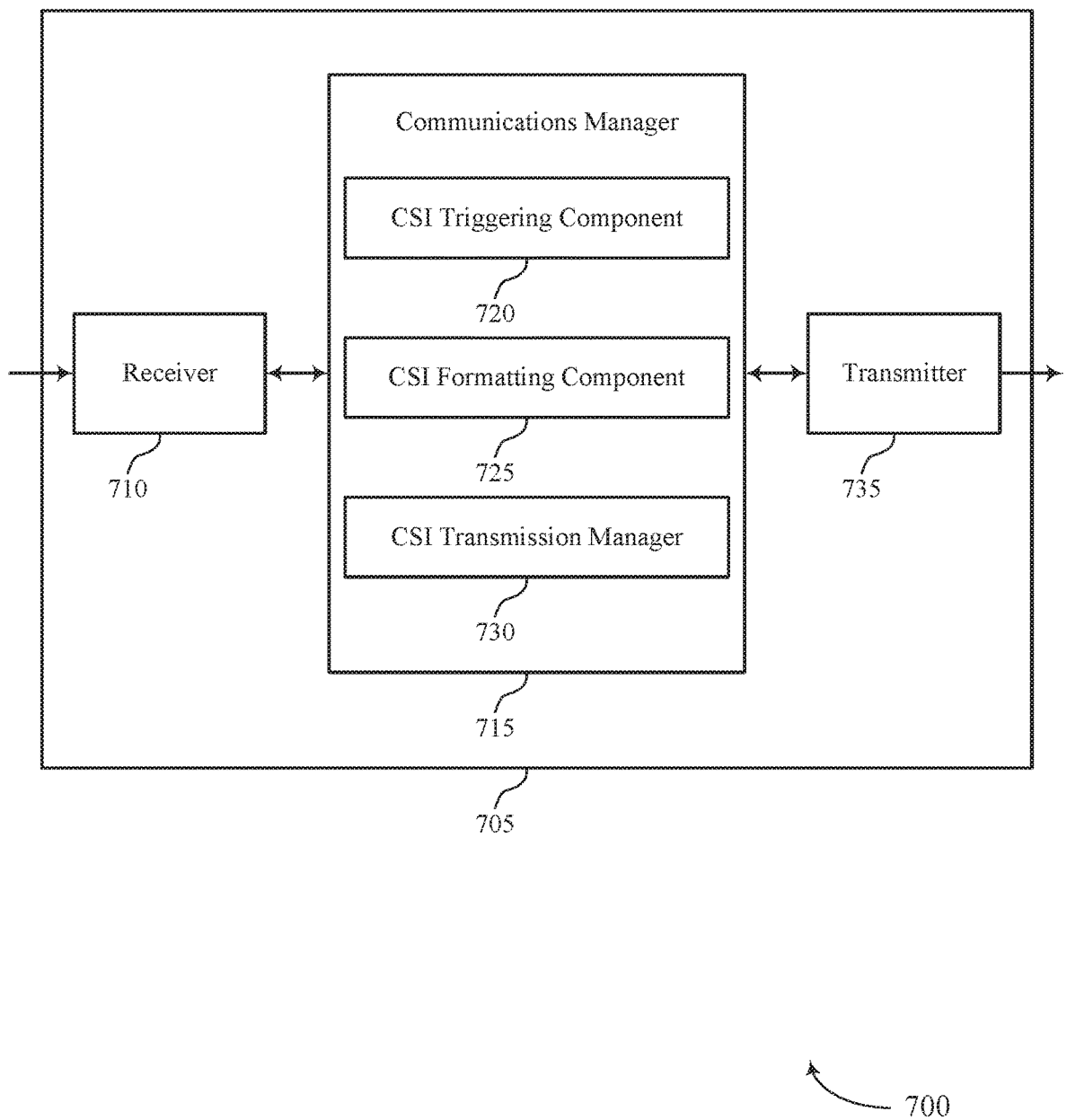

FIG. 7 shows a block diagram 700 of a device 705 that supports non-periodic channel state information triggering and reporting in wireless communications in accordance with aspects of the present disclosure. The device 705 may be an example of aspects of a device 605 or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to non-periodic channel state information triggering and reporting in wireless communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a CSI triggering component 720, a CSI formatting component 725, and a CSI transmission manager 730. The communications manager 715 may be an example of aspects of the communications manager 910 described herein.

The CSI triggering component 720 may receive a first CSI report request indicating that a first CSI report is to be transmitted in a first uplink slot and receive a second CSI report request indicating that a second CSI report is to be transmitted in the first uplink slot. In some cases, the CSI triggering component 720 may receive a first CSI report request indicating that a first CSI report is to be transmitted in a first uplink slot, and a second CSI report request indicating that a second CSI report is to be transmitted in the first uplink slot.

The CSI formatting component 725 may format at least a subset of one or more of the first CSI report or the second CSI report according to a formatting configuration for transmission of multiple CSI reports in a same uplink slot. In some cases, the CSI formatting component 725 may disregard the first CSI report request based on receiving the second CSI report request.

The CSI transmission manager 730 may transmit, based on the formatting, at least the subset of one or more of the first CSI report or the second CSI report in the first uplink slot. In some cases, the CSI transmission manager 730 may transmit the second CSI report in the first uplink slot.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
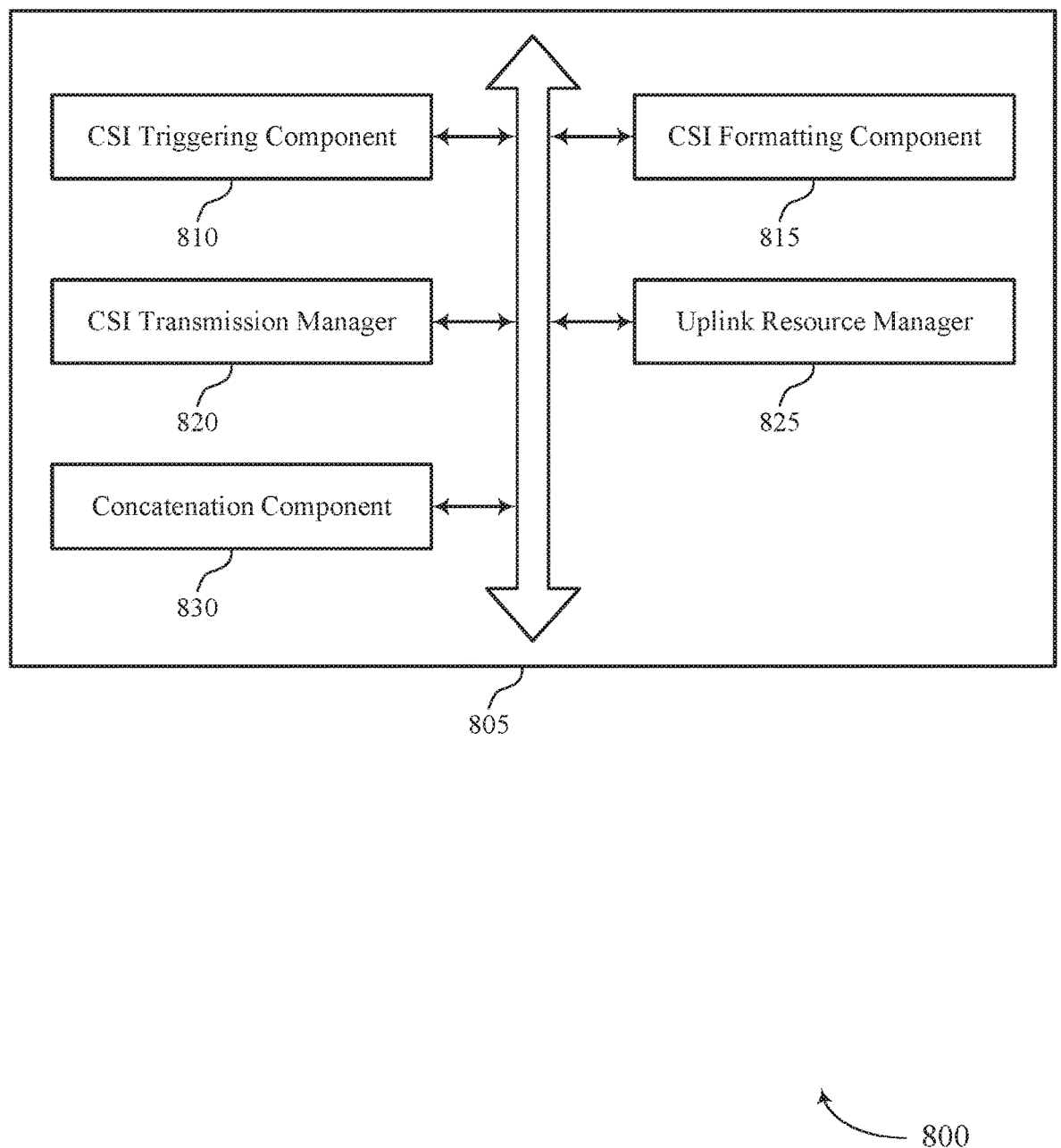
FIG. 8 shows a block diagram of a device that supports non-periodic channel state information triggering and reporting in wireless communications in accordance with aspects of the present disclosure.

FIG. 8 shows a block diagram 800 of a communications manager 805 that supports non-periodic channel state information triggering and reporting in wireless communications in accordance with aspects of the present disclosure. The communications manager 805 may be an example of aspects of a communications manager 615, a communications manager 715, or a communications manager 910 described herein. The communications manager 805 may include a CSI triggering component 810, a CSI formatting component 815, a CSI transmission manager 820, an uplink resource manager 825, and a concatenation component 830. Each of these modules may communicate, directly or indirectly, with one another (e.g., via one or more buses).

The CSI triggering component 810 may receive a first CSI report request indicating that a first CSI report is to be transmitted in a first uplink slot. In some examples, the CSI triggering component 810 may receive a second CSI report request indicating that a second CSI report is to be transmitted in the first uplink slot. In some examples, the CSI triggering component 810 may receive a first CSI report request indicating that a first CSI report is to be transmitted in a first uplink slot, and a second CSI report request indicating that a second CSI report is to be transmitted in the first uplink slot. In some cases, CSI triggering component 810 may receive, with one or more of the first CSI report request or second CSI report request an indication of a number of CSI reports that are scheduled for the first uplink slot. In some cases, CSI triggering component 810 may determine, based on the indicated number of CSI reports that are scheduled for the first uplink slot, that a third CSI report request for a third CSI report to be transmitted in the first uplink slot was lost. In some cases, the indication of the number of CSI reports that are scheduled for the first uplink slot comprises a first counter that provides a number of CSI reports and a second counter that provides an index value within the number of CSI reports for an associated CSI report request.

The CSI formatting component 815 may format at least a subset of one or more of the first CSI report or the second CSI report according to a formatting configuration for transmission of multiple CSI reports in a same uplink slot. In some examples, the CSI formatting component 815 may disregard the first CSI report request based on receiving the second CSI report request.

In some examples, the CSI formatting component 815 may format other uplink control information (UCI) for transmission with at least the subset of one or more of the first CSI report or the second CSI report in the first uplink slot. In some examples, the CSI formatting component 815 may determine that allocated uplink resources for transmission of at least the subset of one or more of the first CSI report or the second CSI report are insufficient for transmission of all of the first CSI report and all of the second CSI report. In some examples, the CSI formatting component 815 may drop one or more fields of the set of fields of the second portion of the first CSI report and the second CSI report that extend beyond the allocated uplink resources. In some cases, the other UCI includes hybrid acknowledgment receipt request (HARQ) feedback information, scheduling request (SR) information, or combinations thereof.

In some examples, the CSI formatting component 815 may format an indication that a CSI report request was lost. In some cases, the indication that a CSI report request was lost comprises a bitmap with consecutive bits that correspond to the number of CSI reports scheduled for the first uplink slot, and a value of each bit indicates whether the corresponding CSI report is transmitted.

In some examples, the CSI formatting component 815 may determine a processing time between receipt of the second CSI report request and the first uplink slot is less than a threshold value. In some examples, the CSI formatting component 815 may drop the second CSI report.

In some examples, the CSI formatting component 815 may determine a processing time between receipt of the first CSI report request and the first uplink slot is less than a threshold value, and where the disregarding is based on the determining. In some cases, the first CSI report request is received earlier in time than the second CSI report request, and the disregarding is based on the earlier received CSI report request. In some cases, the disregarding is based on a serving cell index associated with each of the CSI reports, a component carrier (CC) index associated with each of the CSI reports, or an order in which the CSI report requests are transmitted.

The CSI transmission manager 820 may transmit, based on the formatting, at least the subset of one or more of the first CSI report or the second CSI report in the first uplink slot. In some examples, the CSI transmission manager 820 may transmit the second CSI report in the first uplink slot. In some cases, the transmitting includes transmitting the first CSI report via the first uplink resources of the first CC and transmitting the second CSI report via the second uplink resources of the second CC.

The uplink resource manager 825 may identify uplink resources for transmitting at least the subset of one or more of the first CSI report or the second CSI report based on DCI associated with one or more of the first CSI report request or the second CSI report request. In some examples, the uplink resource manager 825 may identify uplink resources of a second component carrier (CC) for transmitting at least a portion of both the first CSI report and the second CSI report. In some cases, the identifying includes identifying first uplink resources of a first component carrier (CC) based on first DCI associated with the first CSI report request and identifying second uplink resources of a second CC based on second DCI associated with the second CSI report request. In some cases, the uplink resources of the second CC are indicated in DCI associated with the second CSI report request. In some cases, the uplink resources of the second CC are identified based on a CC index value or a serving cell index value associated with each of a first CC associated with the first CSI report request and a second CC associated with the second CSI report request. In some cases, the CC index value or the serving cell index value is selected to be a minimum or a maximum index value of a set of CC index values or serving cell index values.

The concatenation component 830 may concatenate the first CSI report and the second CSI report into a single concatenated CSI report. In some examples, the concatenation component 830 may, for each of the first CSI report and the second CSI report, concatenate a set of fields within each CSI report are ordered based on an associated priority level.

In some examples, the concatenation component 830 may identify a set of fields within each of the first CSI report and the second CSI report, the set of fields including at least a first field and a second field. In some examples, the concatenation component 830 may concatenate the first field of the first CSI report and the first field of the second CSI report, followed by the second field of the first CSI report and the second field of the second CSI report, followed by any other fields of the first CSI report and the second CSI report, to form a single CSI report.

In some examples, the concatenation component 830 may identify at least a first portion and a second portion of each of the first CSI report and the second CSI report, where at least the second portion includes a set of fields including at least a first field. In some examples, the concatenation component 830 may concatenate the first portion of the first CSI report and the first portion of the second CSI report, followed by a concatenation of the first field of the second portion of the first CSI report and the first field of the second portion of the second CSI report, followed by a concatenation of any other fields of the first CSI report and the second CSI report, to form a single CSI report.

In some cases, an order for concatenating the first CSI report and the second CSI report is based on an index value of a serving cell or component carrier associated with each of the first CSI report and the second CSI report. In some cases, an order for concatenating the first CSI report and the second CSI report is based on an order in which the first CSI report request and the second CSI report request are received. In some cases, the set of fields within each CSI report are ordered based on an associated priority level. In some cases, an order for concatenating fields across the CSI reports is based on an index value of a serving cell or component carrier associated with each of the first CSI report and the second CSI report. In some cases, an order for concatenating fields across the CSI reports is based on an order in which the first CSI report request and the second CSI report request are received. In some cases, the first portion includes CSI part 1 report information and the second portion includes CSI part 2 information. In some cases, the set of fields within the second portion of each CSI report are ordered based on an associated priority level.

Figure 9:
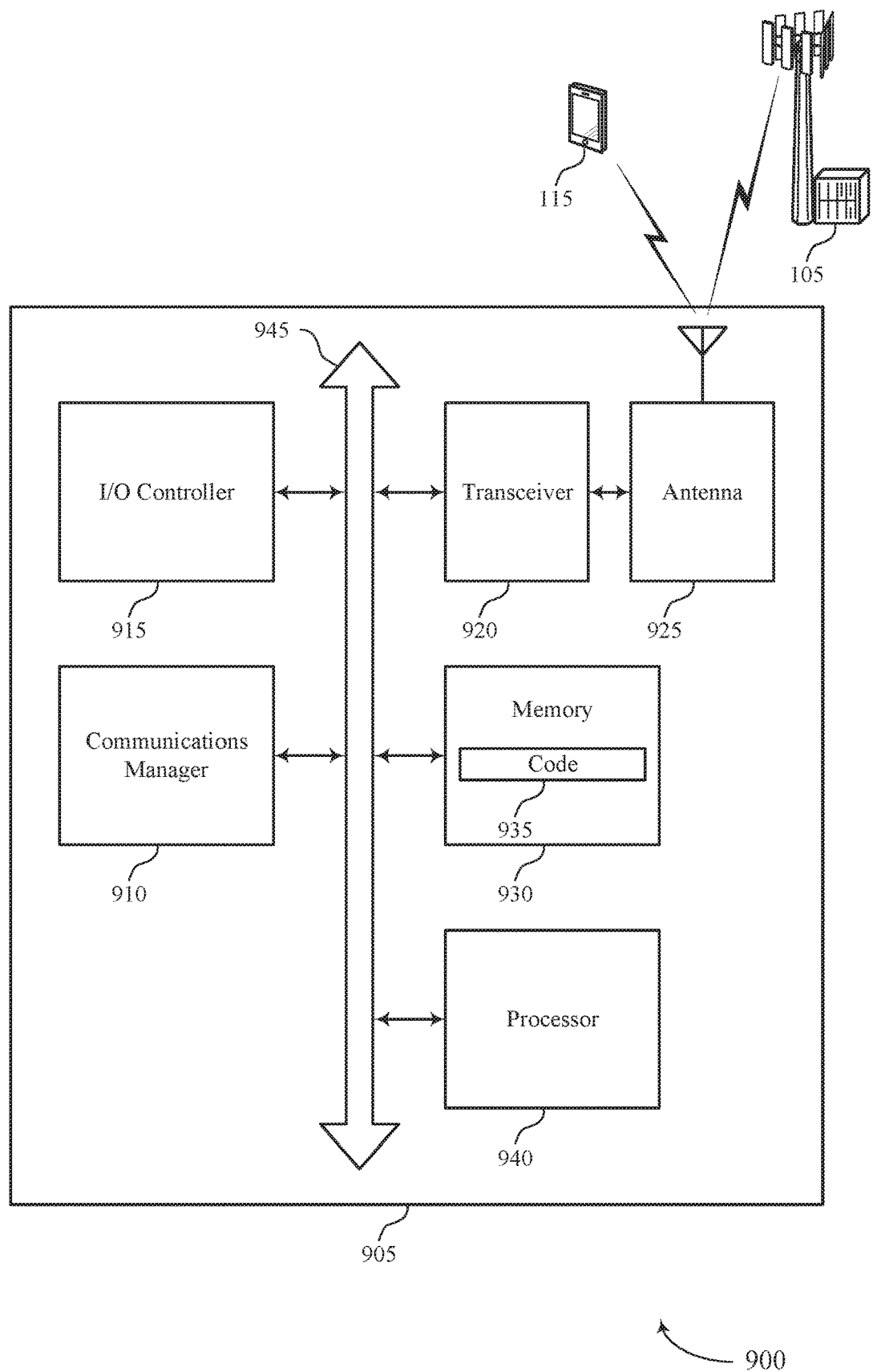
FIG. 9 shows a diagram of a system including a device that supports non-periodic channel state information triggering and reporting in wireless communications in accordance with aspects of the present disclosure.

FIG. 9 shows a diagram of a system 900 including a device 905 that supports non-periodic channel state information triggering and reporting in wireless communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a first CSI report request indicating that a first CSI report is to be transmitted in a first uplink slot, receive a second CSI report request indicating that a second CSI report is to be transmitted in the first uplink slot, format at least a subset of one or more of the first CSI report or the second CSI report according to a formatting configuration for transmission of multiple CSI reports in a same uplink slot, and transmit, based on the formatting, at least the subset of one or more of the first CSI report or the second CSI report in the first uplink slot. The communications manager 910 may also receive a first CSI report request indicating that a first CSI report is to be transmitted in a first uplink slot, and a second CSI report request indicating that a second CSI report is to be transmitted in the first uplink slot, disregard the first CSI report request based on receiving the second CSI report request, and transmit the second CSI report in the first uplink slot.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting non-periodic channel state information triggering and reporting in wireless communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
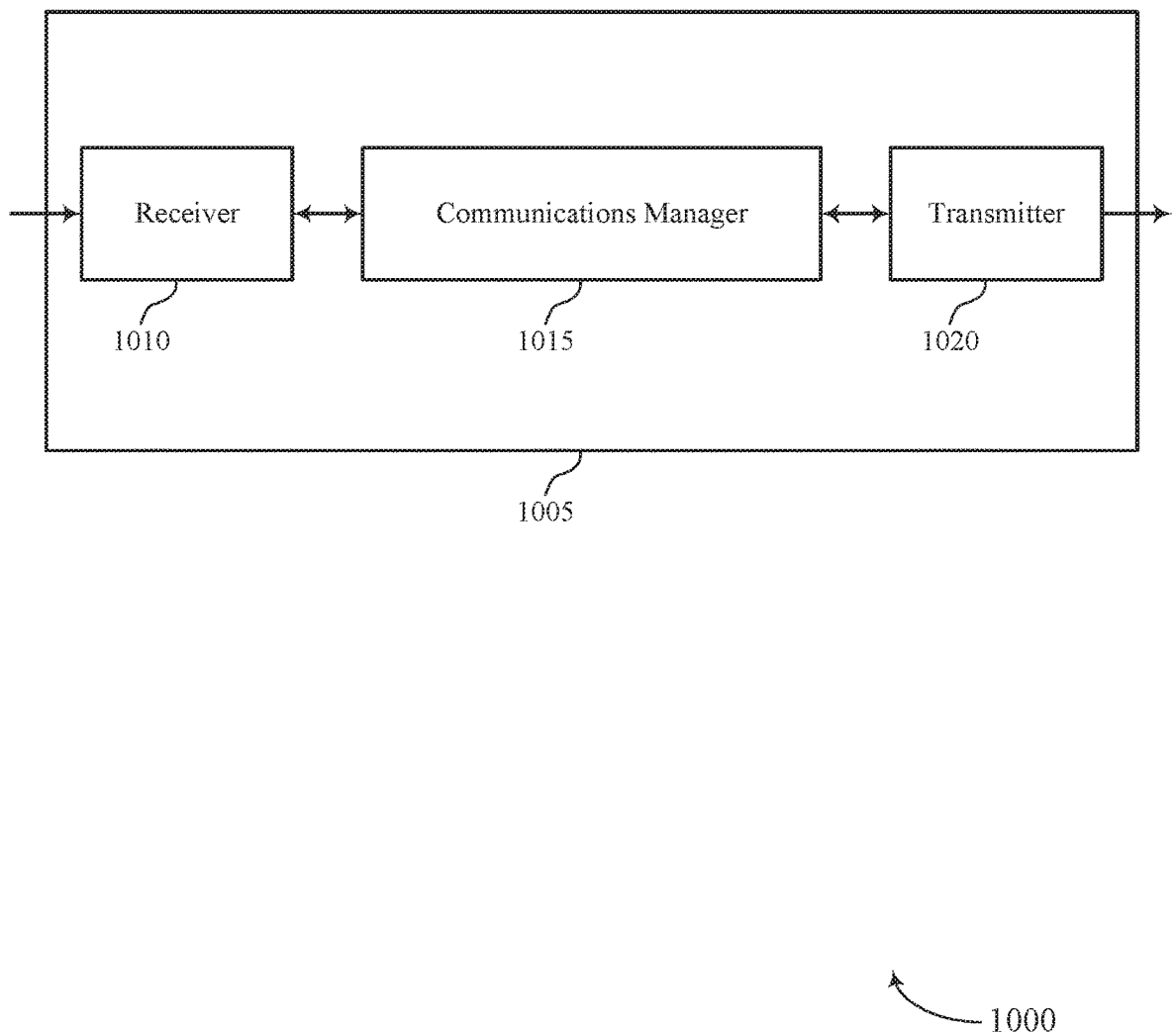
FIGS. 10 and 11 show block diagrams of devices that support non-periodic channel state information triggering and reporting in wireless communications in accordance with aspects of the present disclosure.

FIG. 10 shows a block diagram 1000 of a device 1005 that supports non-periodic channel state information triggering and reporting in wireless communications in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to non-periodic channel state information triggering and reporting in wireless communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, a first CSI report request indicating that a first CSI report is to be provided by the UE in a first uplink slot, transmit, to the UE, a second CSI report request indicating that a second CSI report is to be provided by the UE in the first uplink slot, monitor the first uplink slot for one or more CSI reports from the UE, and decode, based on a formatting configuration for transmission of multiple CSI reports in a same uplink slot, one or more of the first CSI report or the second CSI report.

The communications manager 1015 may also transmit, to a UE, a first CSI report request indicating that a first CSI report is to be provided by the UE in a first uplink slot, determine that a second CSI report request is to be transmitted to the UE, transmit, based on the scheduling, the second CSI report request to the UE, schedule, based on the determining, an uplink slot for transmission of a second CSI report from the UE, where the scheduling includes refraining from scheduling the second CSI report in the first uplink slot or scheduling the second CSI report to be transmitted instead of the first CSI report in the first uplink slot, and receive, based on the scheduling, the first CSI report or the second CSI report in the first uplink slot. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
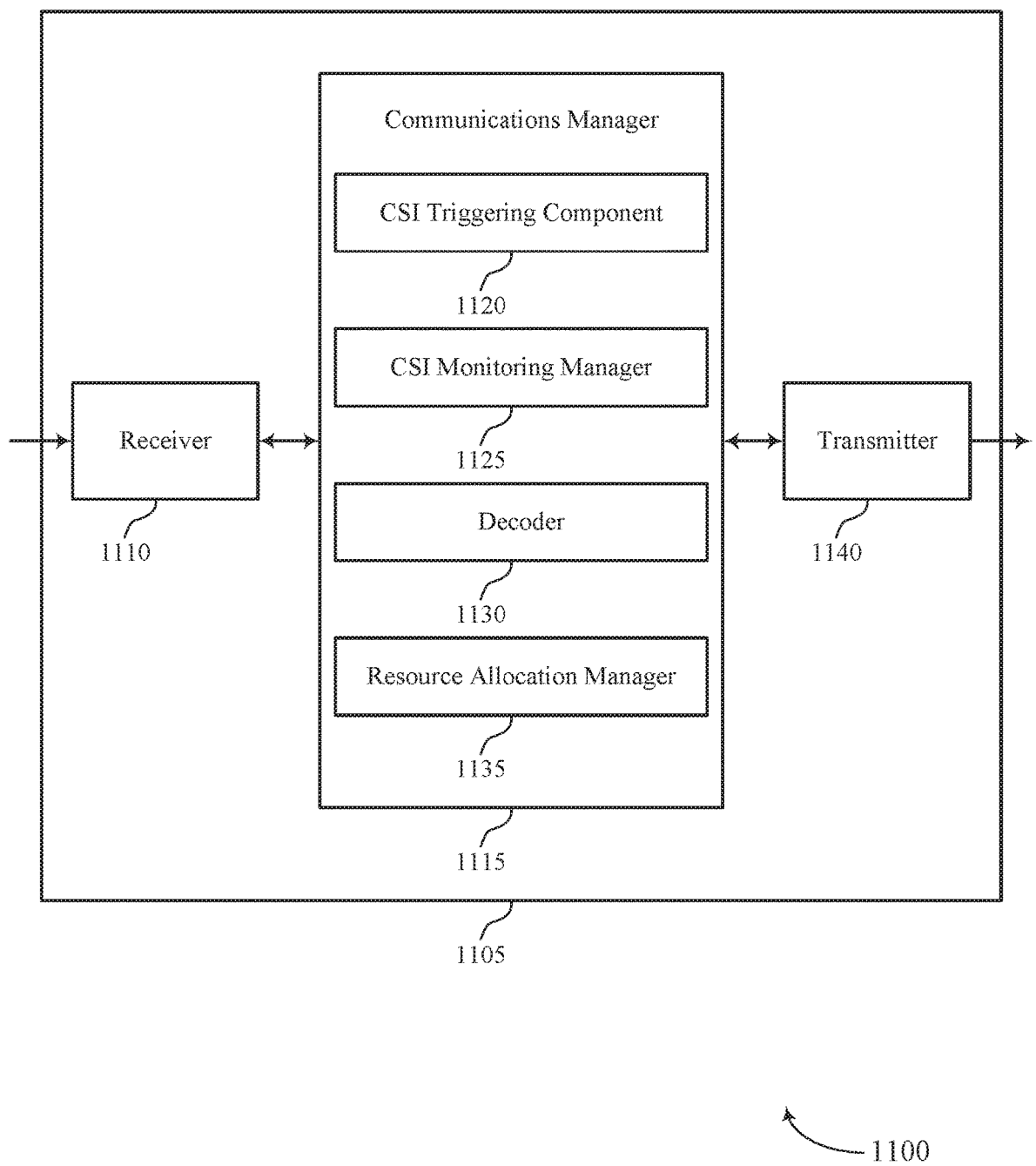

FIG. 11 shows a block diagram 1100 of a device 1105 that supports non-periodic channel state information triggering and reporting in wireless communications in accordance with aspects of the present disclosure. The device 1105 may be an example of aspects of a device 1005 or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to non-periodic channel state information triggering and reporting in wireless communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a CSI triggering component 1120, a CSI monitoring manager 1125, a decoder 1130, and a resource allocation manager 1135. The communications manager 1115 may be an example of aspects of the communications manager 1310 described herein.

The CSI triggering component 1120 may transmit, to a UE, a first CSI report request indicating that a first CSI report is to be provided by the UE in a first uplink slot and transmit, to the UE, a second CSI report request indicating that a second CSI report is to be provided by the UE in the first uplink slot. In some cases, the CSI triggering component 1120 may transmit, to a UE, a first CSI report request indicating that a first CSI report is to be provided by the UE in a first uplink slot, determine that a second CSI report request is to be transmitted to the UE, and transmit, based on the scheduling, the second CSI report request to the UE.

The CSI monitoring manager 1125 may monitor the first uplink slot for one or more CSI reports from the UE. In some cases, the CSI monitoring manager 1125 may receive, based on the scheduling, the first CSI report or the second CSI report in the first uplink slot.

The decoder 1130 may decode, based on a formatting configuration for transmission of multiple CSI reports in a same uplink slot, one or more of the first CSI report or the second CSI report.

The resource allocation manager 1135 may schedule, based on the determining, an uplink slot for transmission of a second CSI report from the UE, where the scheduling includes refraining from scheduling the second CSI report in the first uplink slot or scheduling the second CSI report to be transmitted instead of the first CSI report in the first uplink slot.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
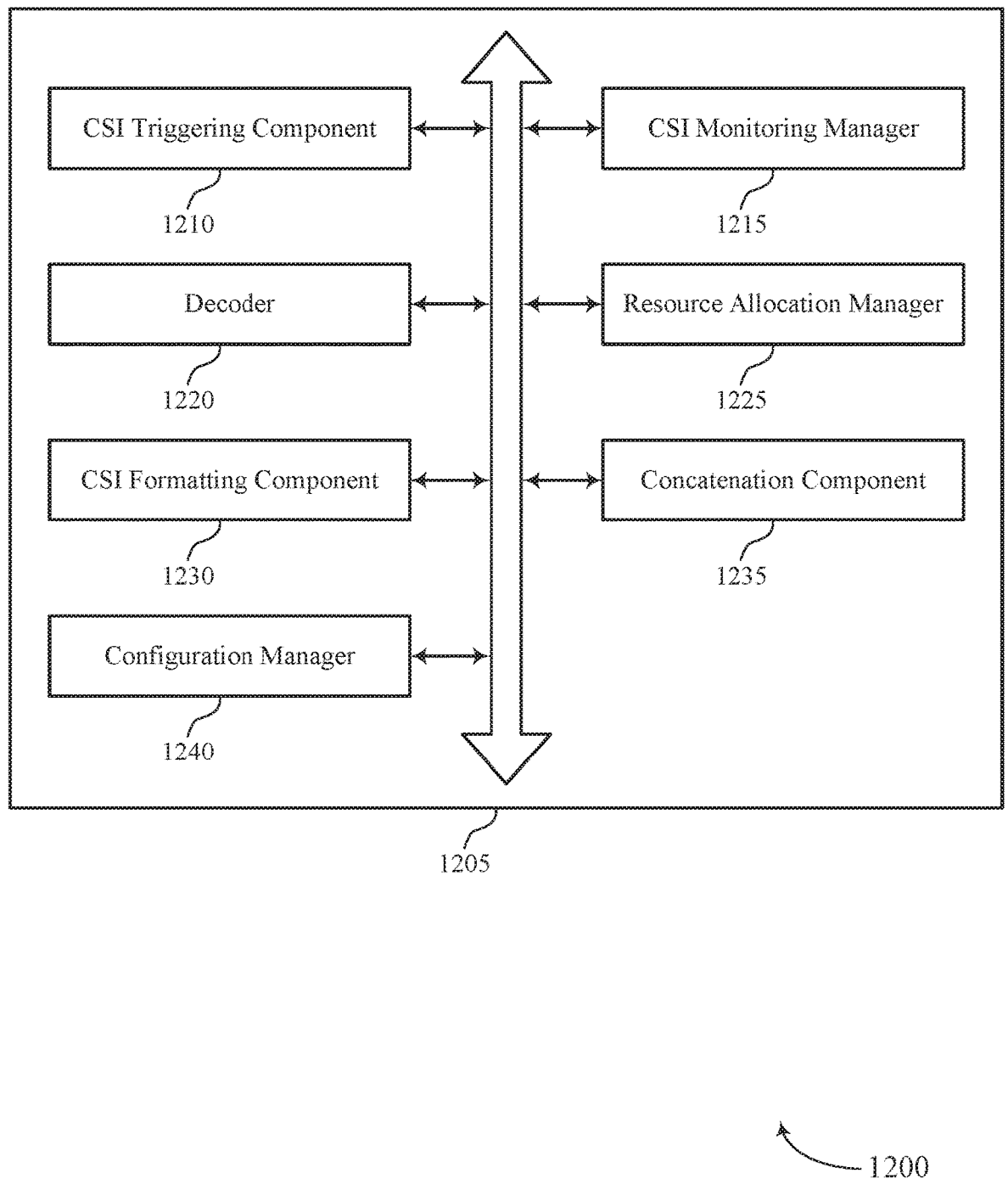
FIG. 12 shows a block diagram of a device that supports non-periodic channel state information triggering and reporting in wireless communications in accordance with aspects of the present disclosure.

FIG. 12 shows a block diagram 1200 of a communications manager 1205 that supports non-periodic channel state information triggering and reporting in wireless communications in accordance with aspects of the present disclosure. The communications manager 1205 may be an example of aspects of a communications manager 1015, a communications manager 1115, or a communications manager 1310 described herein. The communications manager 1205 may include a CSI triggering component 1210, a CSI monitoring manager 1215, a decoder 1220, a resource allocation manager 1225, a CSI formatting component 1230, a concatenation component 1235, and a configuration manager 1240. Each of these modules may communicate, directly or indirectly, with one another (e.g., via one or more buses).

The CSI triggering component 1210 may transmit, to a UE, a first CSI report request indicating that a first CSI report is to be provided by the UE in a first uplink slot. In some examples, the CSI triggering component 1210 may transmit, to the UE, a second CSI report request indicating that a second CSI report is to be provided by the UE in the first uplink slot. In some examples, the CSI triggering component 1210 may transmit, to a UE, a first CSI report request indicating that a first CSI report is to be provided by the UE in a first uplink slot. In some examples, the CSI triggering component 1210 may determine that a second CSI report request is to be transmitted to the UE. In some examples, the CSI triggering component 1210 may transmit, based on the scheduling, the second CSI report request to the UE. In some cases, the second CSI report request has identical content to the first CSI report request. In some cases, the CSI triggering component 1210 may provide an indication of a number of CSI reports that are scheduled for transmission in the first uplink slot and an index value of the corresponding CSI report request within the number of CSI reports that are scheduled for transmission in the first uplink slot.

The CSI monitoring manager 1215 may monitor the first uplink slot for one or more CSI reports from the UE. In some examples, the CSI monitoring manager 1215 may receive, based on the scheduling, the first CSI report or the second CSI report in the first uplink slot.

The decoder 1220 may decode, based on a formatting configuration for transmission of multiple CSI reports in a same uplink slot, one or more of the first CSI report or the second CSI report. In some cases, the decoding may include identifying a bitmap provided with the one or more CSI reports with consecutive bits that correspond to the number of CSI reports scheduled for the first uplink slot, and a value of each bit indicates whether the corresponding CSI report is included with the one or more CSI reports. The decoder 1220 may decode the multiple CSI reports based on the included CSI reports.

The resource allocation manager 1225 may schedule, based on the determining, an uplink slot for transmission of a second CSI report from the UE, where the scheduling includes refraining from scheduling the second CSI report in the first uplink slot or scheduling the second CSI report to be transmitted instead of the first CSI report in the first uplink slot. In some examples, the resource allocation manager 1225 may allocate uplink resources to the UE for transmitting the first CSI report and the second CSI report in the first uplink slot. In some examples, the resource allocation manager 1225 may transmit an indication of the allocated uplink resources in part on DCI associated with one or more of the first CSI report request or the second CSI report request.

In some examples, the resource allocation manager 1225 may identify prior allocated resources for the first CSI report provided with the first CSI report request that may be re-allocated for other uplink transmissions different than the first CSI report.

In some cases, the allocating includes allocating uplink resources of a second component carrier (CC) for transmitting at least a portion of both the first CSI report and the second CSI report. In some cases, the transmitting includes transmitting the indication of the allocated uplink resources in DCI associated with the second CSI report request. In some cases, the uplink resources of the second CC are selected based on a CC index value or a serving cell index value associated with each of a first CC associated with the first CSI report request and the second CC associated with the second CSI report request.

The CSI formatting component 1230 may identify a CSI formatting configuration for receiving the CSI reports. In some cases, the formatting configuration includes a concatenation of the first CSI report and the second CSI report into a single concatenated CSI report. In some cases, an order in which the first CSI report and the second CSI report are concatenated is based on a serving cell index associated with each of the CSI reports, a component carrier (CC) index associated with each of the CSI reports, or an order in which the CSI report requests are transmitted. In some cases, the formatting configuration includes an order of fields within each CSI report based associated priority levels of a set of fields.

The concatenation component 1235 may identify concatenated CSI reports, portions of CSI reports, or fields of CSI reports. In some cases, the formatting configuration includes a concatenation of a first portion of each CSI report followed by concatenation per field for a set of fields across CSI reports for second portion of each CSI report. In some cases, the first portion includes CSI part 1 report information and the second portion includes CSI part 2 information.

The configuration manager 1240 may configure one or more CSI-related parameters. In some cases, the UE is configured to transmit only a single CSI report in one uplink slot.

Figure 13:
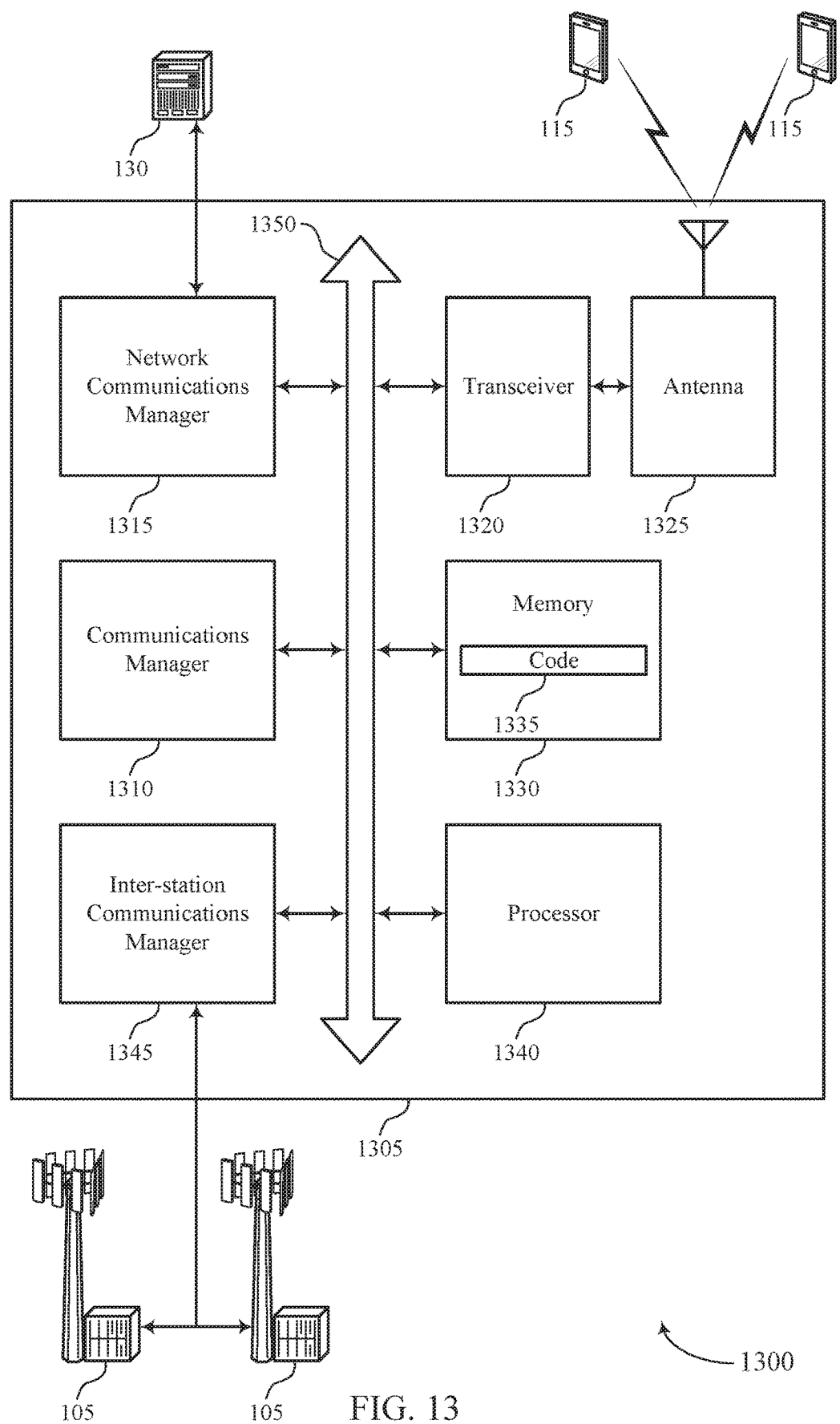
FIG. 13 shows a diagram of a system including a device that supports non-periodic channel state information triggering and reporting in wireless communications in accordance with aspects of the present disclosure.

FIG. 13 shows a diagram of a system 1300 including a device 1305 that supports non-periodic channel state information triggering and reporting in wireless communications in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, a first CSI report request indicating that a first CSI report is to be provided by the UE in a first uplink slot, transmit, to the UE, a second CSI report request indicating that a second CSI report is to be provided by the UE in the first uplink slot, monitor the first uplink slot for one or more CSI reports from the UE, and decode, based on a formatting configuration for transmission of multiple CSI reports in a same uplink slot, one or more of the first CSI report or the second CSI report. The communications manager 1310 may also transmit, to a UE, a first CSI report request indicating that a first CSI report is to be provided by the UE in a first uplink slot, determine that a second CSI report request is to be transmitted to the UE, transmit, based on the scheduling, the second CSI report request to the UE, schedule, based on the determining, an uplink slot for transmission of a second CSI report from the UE, where the scheduling includes refraining from scheduling the second CSI report in the first uplink slot or scheduling the second CSI report to be transmitted instead of the first CSI report in the first uplink slot, and receive, based on the scheduling, the first CSI report or the second CSI report in the first uplink slot.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device to perform various functions (e.g., functions or tasks supporting non-periodic channel state information triggering and reporting in wireless communications).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
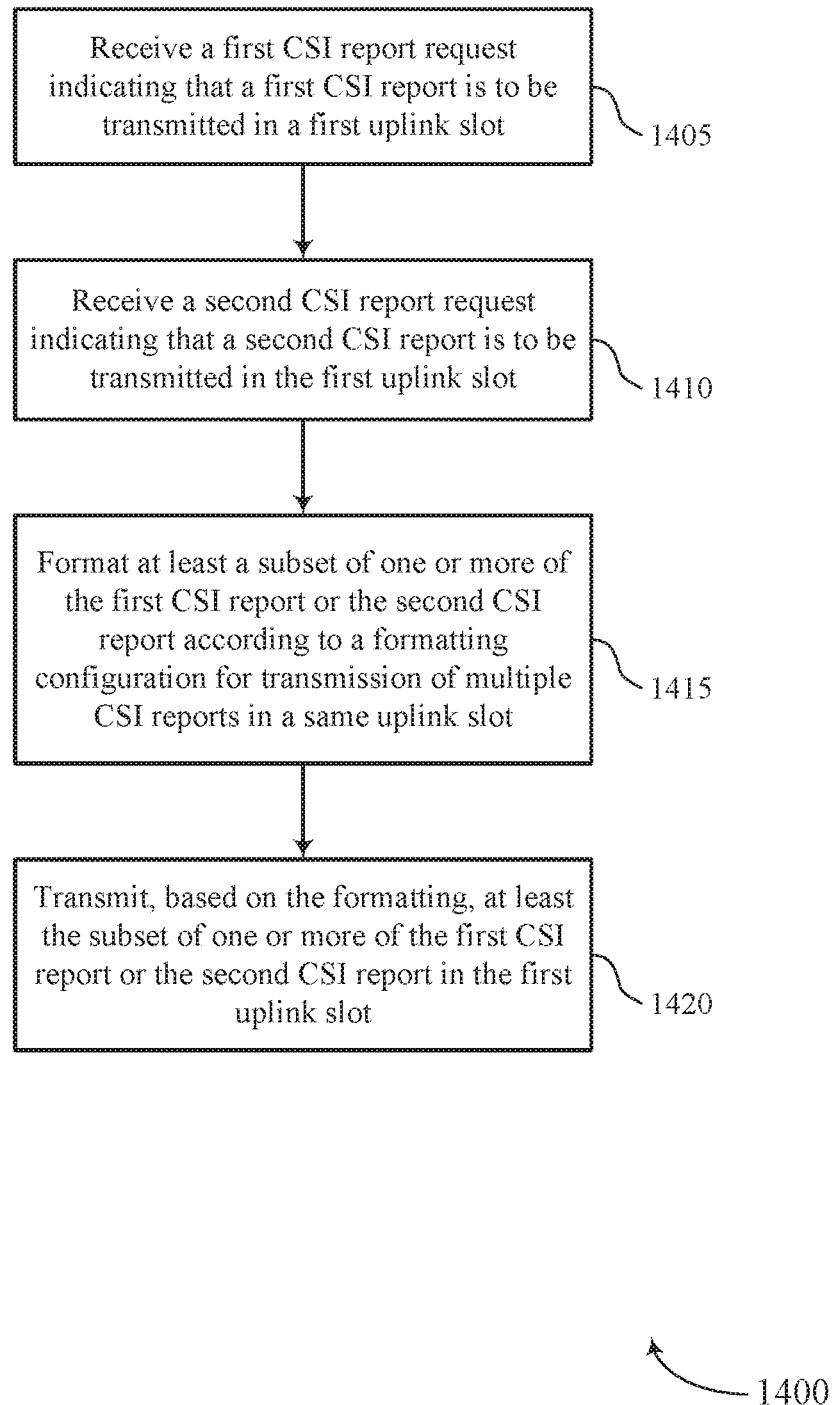
FIGS. 14 through 23 show flowcharts illustrating methods that support non-periodic channel state information triggering and reporting in wireless communications in accordance with aspects of the present disclosure.

FIG. 14 shows a flowchart illustrating a method 1400 that supports non-periodic channel state information triggering and reporting in wireless communications in accordance with aspects of the present disclosure. The operations of method 1400 may be implemented by a UE 115 or its components as described herein. For example, the operations of method 1400 may be performed by a communications manager as described with reference to FIGS. 6 to 9. In some examples, a UE may execute a set of instructions to control the functional elements of the UE to perform the functions described below. Additionally or alternatively, a UE may perform aspects of the functions described below using special-purpose hardware.

At 1405, the UE may receive a first CSI report request indicating that a first CSI report is to be transmitted in a first uplink slot. The operations of 1405 may be performed according to the methods described herein. In some examples, aspects of the operations of 1405 may be performed by a CSI triggering component as described with reference to FIGS. 6 to 9.

At 1410, the UE may receive a second CSI report request indicating that a second CSI report is to be transmitted in the first uplink slot. The operations of 1410 may be performed according to the methods described herein. In some examples, aspects of the operations of 1410 may be performed by a CSI triggering component as described with reference to FIGS. 6 to 9.

At 1415, the UE may format at least a subset of one or more of the first CSI report or the second CSI report according to a formatting configuration for transmission of multiple CSI reports in a same uplink slot. The operations of 1415 may be performed according to the methods described herein. In some examples, aspects of the operations of 1415 may be performed by a CSI formatting component as described with reference to FIGS. 6 to 9.

At 1420, the UE may transmit, based on the formatting, at least the subset of one or more of the first CSI report or the second CSI report in the first uplink slot. The operations of 1420 may be performed according to the methods described herein. In some examples, aspects of the operations of 1420 may be performed by a CSI transmission manager as described with reference to FIGS. 6 to 9.

Figure 15:
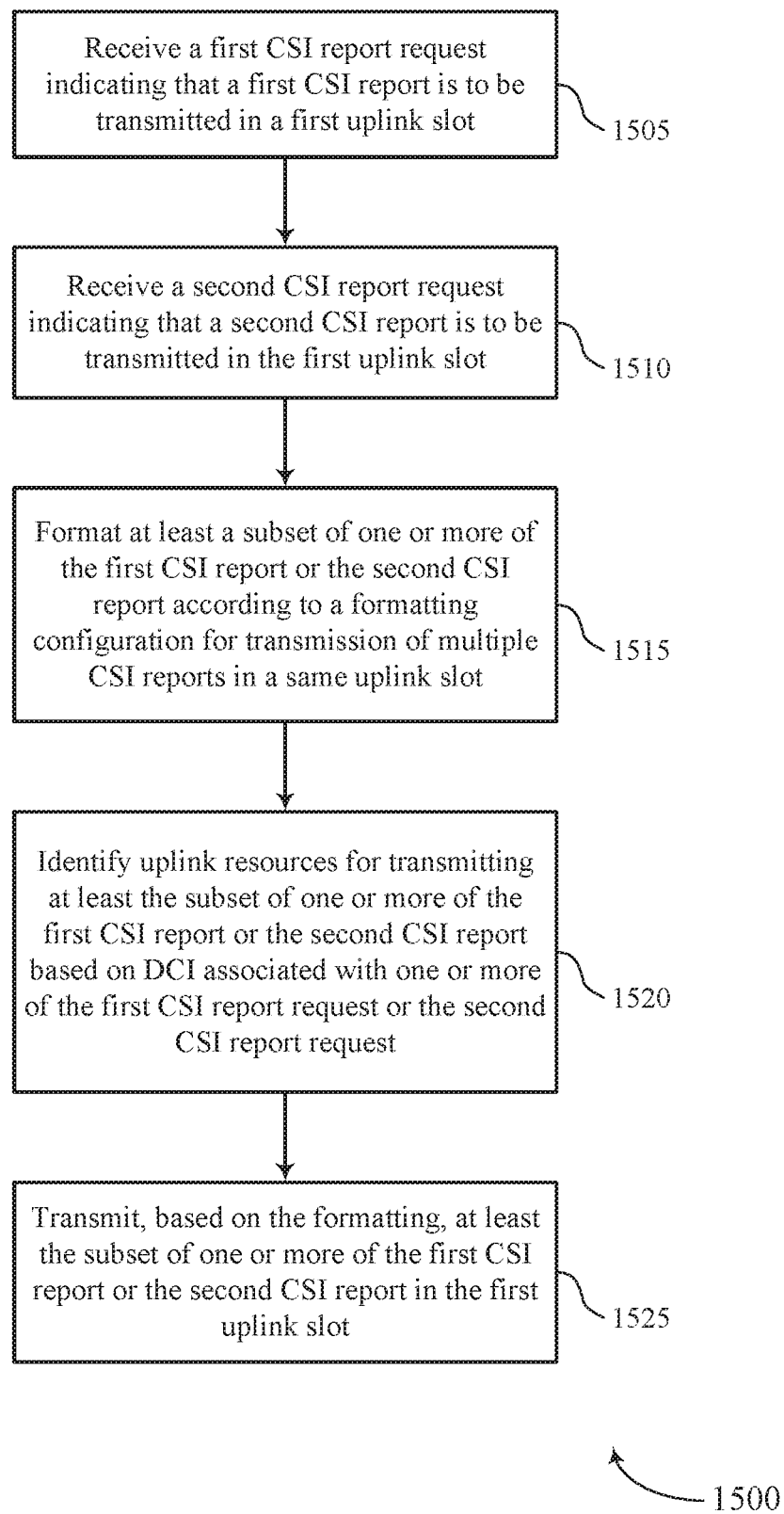

FIG. 15 shows a flowchart illustrating a method 1500 that supports non-periodic channel state information triggering and reporting in wireless communications in accordance with aspects of the present disclosure. The operations of method 1500 may be implemented by a UE 115 or its components as described herein. For example, the operations of method 1500 may be performed by a communications manager as described with reference to FIGS. 6 to 9. In some examples, a UE may execute a set of instructions to control the functional elements of the UE to perform the functions described below. Additionally or alternatively, a UE may perform aspects of the functions described below using special-purpose hardware.

At 1505, the UE may receive a first CSI report request indicating that a first CSI report is to be transmitted in a first uplink slot. The operations of 1505 may be performed according to the methods described herein. In some examples, aspects of the operations of 1505 may be performed by a CSI triggering component as described with reference to FIGS. 6 to 9.

At 1510, the UE may receive a second CSI report request indicating that a second CSI report is to be transmitted in the first uplink slot. The operations of 1510 may be performed according to the methods described herein. In some examples, aspects of the operations of 1510 may be performed by a CSI triggering component as described with reference to FIGS. 6 to 9. In some cases, some cases, the UE may receive, with one or more of the first CSI report request or second CSI report request, an indication of a number of CSI reports that are scheduled for the first uplink slot. In some cases, the UE may determine, based on the indicated number of CSI reports that are scheduled for the first uplink slot, that a third CSI report request for a third CSI report to be transmitted in the first uplink slot was lost.

At 1515, the UE may format at least a subset of one or more of the first CSI report or the second CSI report according to a formatting configuration for transmission of multiple CSI reports in a same uplink slot. The operations of 1515 may be performed according to the methods described herein. In some examples, aspects of the operations of 1515 may be performed by a CSI formatting component as described with reference to FIGS. 6 to 9. In some cases, the UE may format an indication that a CSI report request was lost. In some cases, the indication that a CSI report request was lost comprises a bitmap with consecutive bits that correspond to the number of CSI reports scheduled for the first uplink slot, and a value of each bit indicates whether the corresponding CSI report is transmitted.

At 1520, the UE may identify uplink resources for transmitting at least the subset of one or more of the first CSI report or the second CSI report based on DCI associated with one or more of the first CSI report request or the second CSI report request. The operations of 1520 may be performed according to the methods described herein. In some examples, aspects of the operations of 1520 may be performed by an uplink resource manager as described with reference to FIGS. 6 to 9.

At 1525, the UE may transmit, based on the formatting, at least the subset of one or more of the first CSI report or the second CSI report in the first uplink slot. The operations of 1525 may be performed according to the methods described herein. In some examples, aspects of the operations of 1525 may be performed by a CSI transmission manager as described with reference to FIGS. 6 to 9.

Figure 16:
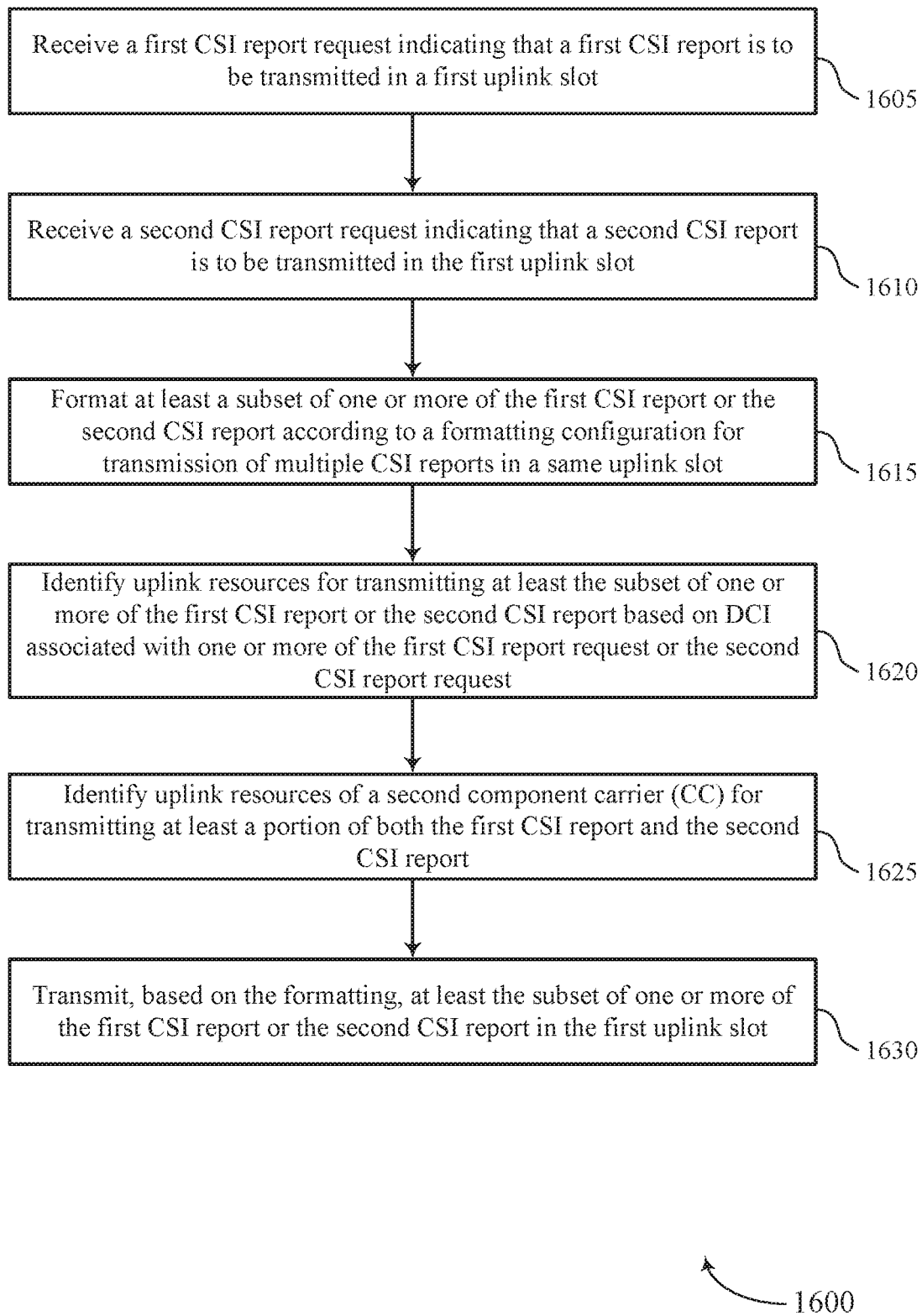

FIG. 16 shows a flowchart illustrating a method 1600 that supports non-periodic channel state information triggering and reporting in wireless communications in accordance with aspects of the present disclosure. The operations of method 1600 may be implemented by a UE 115 or its components as described herein. For example, the operations of method 1600 may be performed by a communications manager as described with reference to FIGS. 6 to 9. In some examples, a UE may execute a set of instructions to control the functional elements of the UE to perform the functions described below. Additionally or alternatively, a UE may perform aspects of the functions described below using special-purpose hardware.

At 1605, the UE may receive a first CSI report request indicating that a first CSI report is to be transmitted in a first uplink slot. The operations of 1605 may be performed according to the methods described herein. In some examples, aspects of the operations of 1605 may be performed by a CSI triggering component as described with reference to FIGS. 6 to 9.

At 1610, the UE may receive a second CSI report request indicating that a second CSI report is to be transmitted in the first uplink slot. The operations of 1610 may be performed according to the methods described herein. In some examples, aspects of the operations of 1610 may be performed by a CSI triggering component as described with reference to FIGS. 6 to 9.

At 1615, the UE may format at least a subset of one or more of the first CSI report or the second CSI report according to a formatting configuration for transmission of multiple CSI reports in a same uplink slot. The operations of 1615 may be performed according to the methods described herein. In some examples, aspects of the operations of 1615 may be performed by a CSI formatting component as described with reference to FIGS. 6 to 9.

At 1620, the UE may identify uplink resources for transmitting at least the subset of one or more of the first CSI report or the second CSI report based on DCI associated with one or more of the first CSI report request or the second CSI report request. The operations of 1620 may be performed according to the methods described herein. In some examples, aspects of the operations of 1620 may be performed by an uplink resource manager as described with reference to FIGS. 6 to 9.

At 1625, the UE may identify uplink resources of a second component carrier (CC) for transmitting at least a portion of both the first CSI report and the second CSI report. The operations of 1625 may be performed according to the methods described herein. In some examples, aspects of the operations of 1625 may be performed by an uplink resource manager as described with reference to FIGS. 6 to 9.

At 1630, the UE may transmit, based on the formatting, at least the subset of one or more of the first CSI report or the second CSI report in the first uplink slot. The operations of 1630 may be performed according to the methods described herein. In some examples, aspects of the operations of 1630 may be performed by a CSI transmission manager as described with reference to FIGS. 6 to 9.

Figure 17:
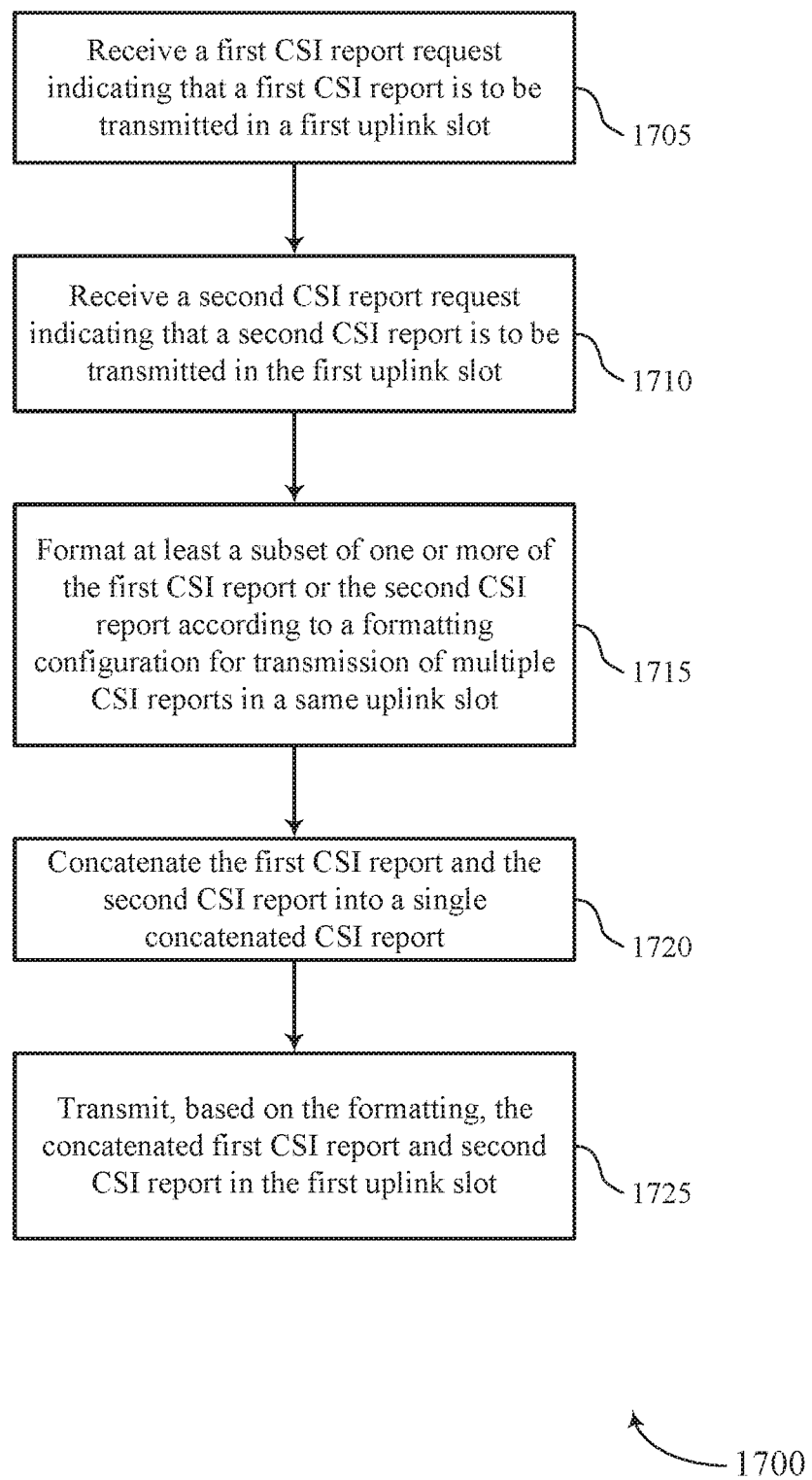

FIG. 17 shows a flowchart illustrating a method 1700 that supports non-periodic channel state information triggering and reporting in wireless communications in accordance with aspects of the present disclosure. The operations of method 1700 may be implemented by a UE 115 or its components as described herein. For example, the operations of method 1700 may be performed by a communications manager as described with reference to FIGS. 6 to 9. In some examples, a UE may execute a set of instructions to control the functional elements of the UE to perform the functions described below. Additionally or alternatively, a UE may perform aspects of the functions described below using special-purpose hardware.

At 1705, the UE may receive a first CSI report request indicating that a first CSI report is to be transmitted in a first uplink slot. The operations of 1705 may be performed according to the methods described herein. In some examples, aspects of the operations of 1705 may be performed by a CSI triggering component as described with reference to FIGS. 6 to 9.

At 1710, the UE may receive a second CSI report request indicating that a second CSI report is to be transmitted in the first uplink slot. The operations of 1710 may be performed according to the methods described herein. In some examples, aspects of the operations of 1710 may be performed by a CSI triggering component as described with reference to FIGS. 6 to 9.

At 1715, the UE may format at least a subset of one or more of the first CSI report or the second CSI report according to a formatting configuration for transmission of multiple CSI reports in a same uplink slot. The operations of 1715 may be performed according to the methods described herein. In some examples, aspects of the operations of 1715 may be performed by a CSI formatting component as described with reference to FIGS. 6 to 9.

At 1720, the UE may concatenate the first CSI report and the second CSI report into a single concatenated CSI report. The operations of 1720 may be performed according to the methods described herein. In some examples, aspects of the operations of 1720 may be performed by a concatenation component as described with reference to FIGS. 6 to 9.

At 1725, the UE may transmit, based on the formatting, the concatenated first CSI report and second CSI report in the first uplink slot. The operations of 1725 may be performed according to the methods described herein. In some examples, aspects of the operations of 1725 may be performed by a CSI transmission manager as described with reference to FIGS. 6 to 9.

Figure 18:
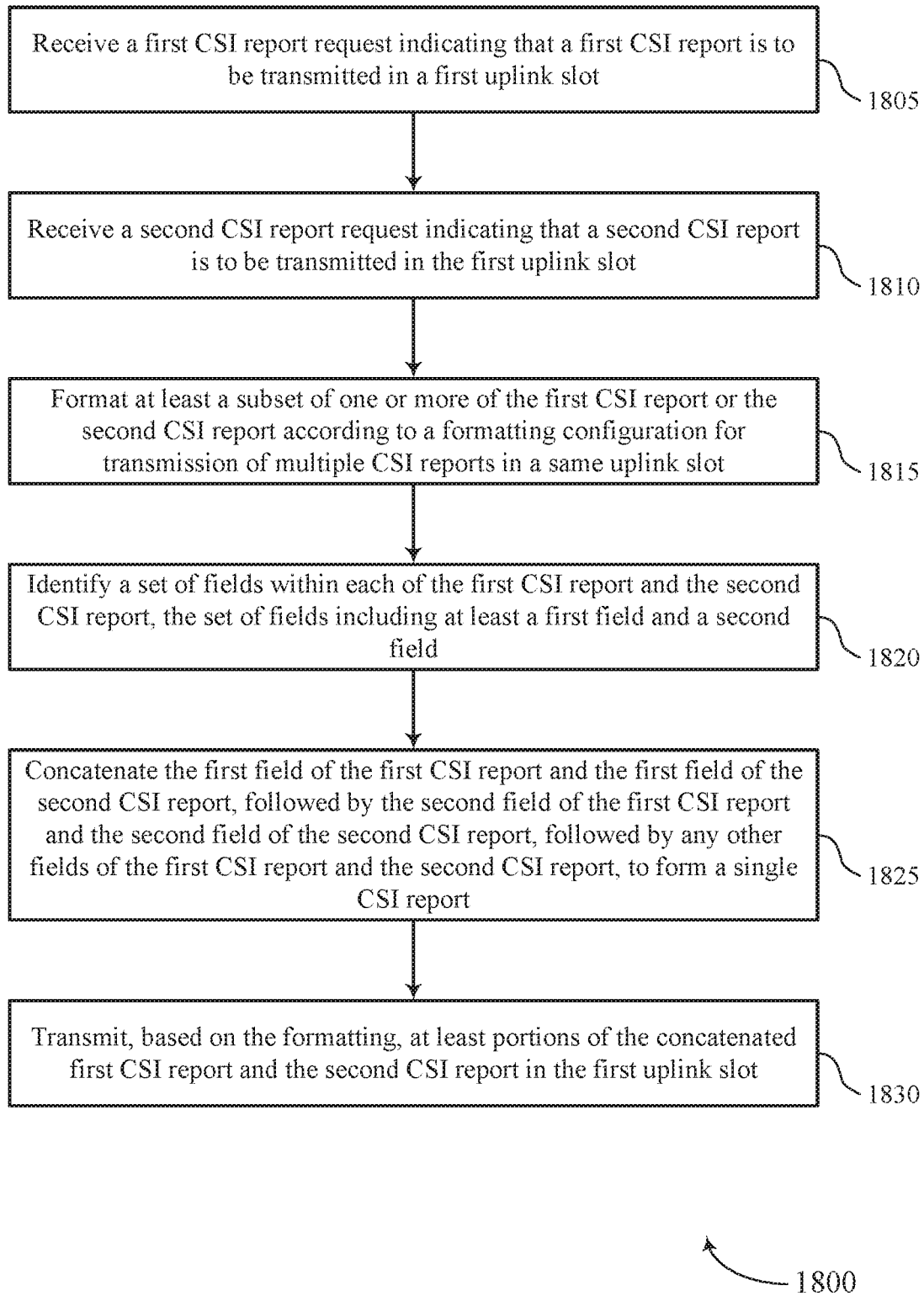

FIG. 18 shows a flowchart illustrating a method 1800 that supports non-periodic channel state information triggering and reporting in wireless communications in accordance with aspects of the present disclosure. The operations of method 1800 may be implemented by a UE 115 or its components as described herein. For example, the operations of method 1800 may be performed by a communications manager as described with reference to FIGS. 6 to 9. In some examples, a UE may execute a set of instructions to control the functional elements of the UE to perform the functions described below. Additionally or alternatively, a UE may perform aspects of the functions described below using special-purpose hardware.

At 1805, the UE may receive a first CSI report request indicating that a first CSI report is to be transmitted in a first uplink slot. The operations of 1805 may be performed according to the methods described herein. In some examples, aspects of the operations of 1805 may be performed by a CSI triggering component as described with reference to FIGS. 6 to 9.

At 1810, the UE may receive a second CSI report request indicating that a second CSI report is to be transmitted in the first uplink slot. The operations of 1810 may be performed according to the methods described herein. In some examples, aspects of the operations of 1810 may be performed by a CSI triggering component as described with reference to FIGS. 6 to 9.

At 1815, the UE may format at least a subset of one or more of the first CSI report or the second CSI report according to a formatting configuration for transmission of multiple CSI reports in a same uplink slot. The operations of 1815 may be performed according to the methods described herein. In some examples, aspects of the operations of 1815 may be performed by a CSI formatting component as described with reference to FIGS. 6 to 9.

At 1820, the UE may identify a set of fields within each of the first CSI report and the second CSI report, the set of fields including at least a first field and a second field. The operations of 1820 may be performed according to the methods described herein. In some examples, aspects of the operations of 1820 may be performed by a concatenation component as described with reference to FIGS. 6 to 9.

At 1825, the UE may concatenate the first field of the first CSI report and the first field of the second CSI report, followed by the second field of the first CSI report and the second field of the second CSI report, followed by any other fields of the first CSI report and the second CSI report, to form a single CSI report. The operations of 1825 may be performed according to the methods described herein. In some examples, aspects of the operations of 1825 may be performed by a concatenation component as described with reference to FIGS. 6 to 9.

At 1830, the UE may transmit, based on the formatting, at least portions of the concatenated first CSI report and the second CSI report in the first uplink slot. The operations of 1830 may be performed according to the methods described herein. In some examples, aspects of the operations of 1830 may be performed by a CSI transmission manager as described with reference to FIGS. 6 to 9.

Figure 19:
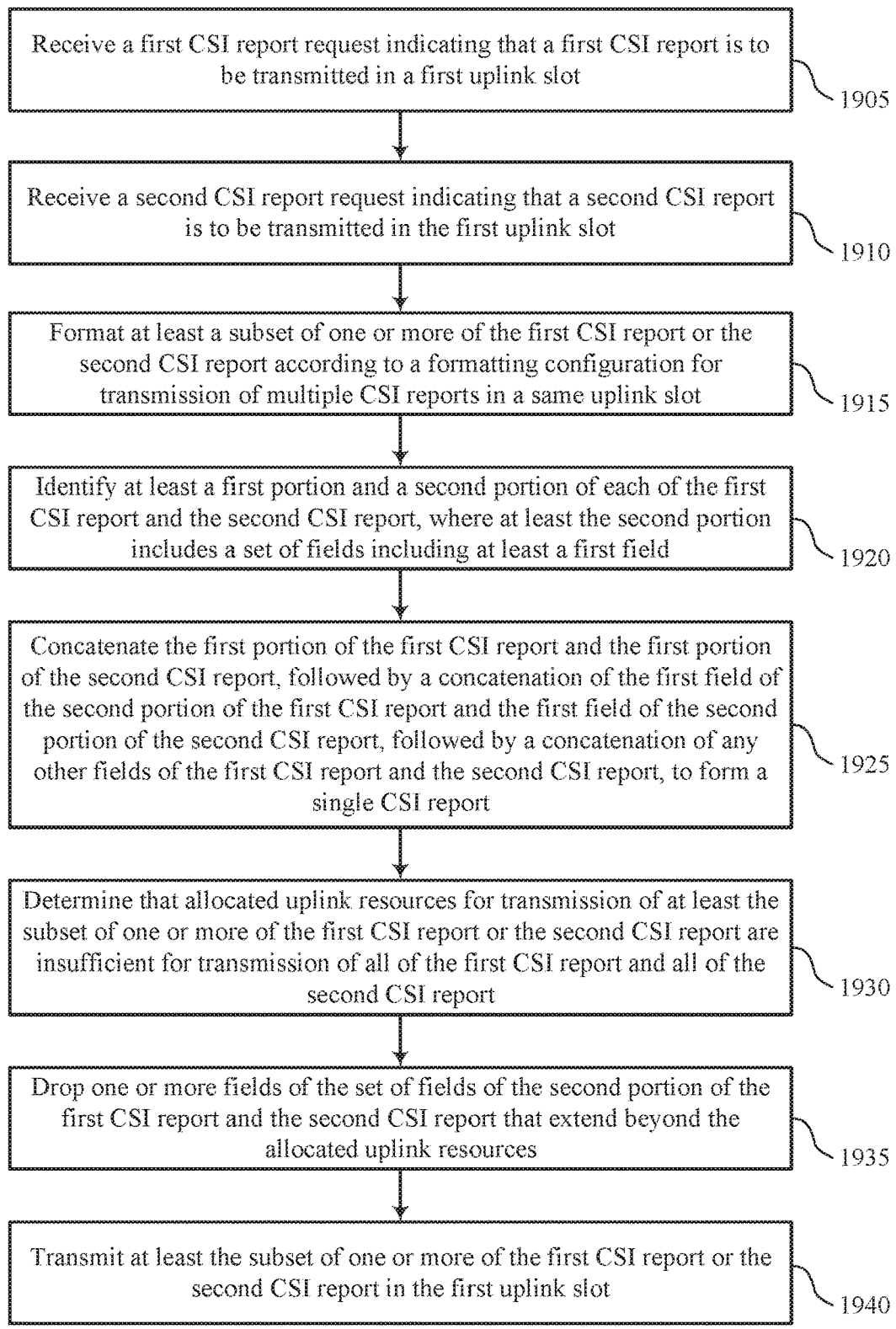

FIG. 19 shows a flowchart illustrating a method 1900 that supports non-periodic channel state information triggering and reporting in wireless communications in accordance with aspects of the present disclosure. The operations of method 1900 may be implemented by a UE 115 or its components as described herein. For example, the operations of method 1900 may be performed by a communications manager as described with reference to FIGS. 6 to 9. In some examples, a UE may execute a set of instructions to control the functional elements of the UE to perform the functions described below. Additionally or alternatively, a UE may perform aspects of the functions described below using special-purpose hardware.

At 1905, the UE may receive a first CSI report request indicating that a first CSI report is to be transmitted in a first uplink slot. The operations of 1905 may be performed according to the methods described herein. In some examples, aspects of the operations of 1905 may be performed by a CSI triggering component as described with reference to FIGS. 6 to 9.

At 1910, the UE may receive a second CSI report request indicating that a second CSI report is to be transmitted in the first uplink slot. The operations of 1910 may be performed according to the methods described herein. In some examples, aspects of the operations of 1910 may be performed by a CSI triggering component as described with reference to FIGS. 6 to 9.

At 1915, the UE may format at least a subset of one or more of the first CSI report or the second CSI report according to a formatting configuration for transmission of multiple CSI reports in a same uplink slot. The operations of 1915 may be performed according to the methods described herein. In some examples, aspects of the operations of 1915 may be performed by a CSI formatting component as described with reference to FIGS. 6 to 9.

At 1920, the UE may identify at least a first portion and a second portion of each of the first CSI report and the second CSI report, where at least the second portion includes a set of fields including at least a first field. The operations of 1920 may be performed according to the methods described herein. In some examples, aspects of the operations of 1920 may be performed by a concatenation component as described with reference to FIGS. 6 to 9.

At 1925, the UE may concatenate the first portion of the first CSI report and the first portion of the second CSI report, followed by a concatenation of the first field of the second portion of the first CSI report and the first field of the second portion of the second CSI report, followed by a concatenation of any other fields of the first CSI report and the second CSI report, to form a single CSI report. The operations of 1925 may be performed according to the methods described herein. In some examples, aspects of the operations of 1925 may be performed by a concatenation component as described with reference to FIGS. 6 to 9.

At 1930, the UE may determine that allocated uplink resources for transmission of at least the subset of one or more of the first CSI report or the second CSI report are insufficient for transmission of all of the first CSI report and all of the second CSI report. The operations of 1930 may be performed according to the methods described herein. In some examples, aspects of the operations of 1930 may be performed by a CSI formatting component as described with reference to FIGS. 6 to 9.

At 1935, the UE may drop one or more fields of the set of fields of the second portion of the first CSI report and the second CSI report that extend beyond the allocated uplink resources. The operations of 1935 may be performed according to the methods described herein. In some examples, aspects of the operations of 1935 may be performed by a CSI formatting component as described with reference to FIGS. 6 to 9.

At 1940, the UE may transmit at least the subset of one or more of the first CSI report or the second CSI report in the first uplink slot. The operations of 1940 may be performed according to the methods described herein. In some examples, aspects of the operations of 1940 may be performed by a CSI transmission manager as described with reference to FIGS. 6 to 9.

Figure 20:
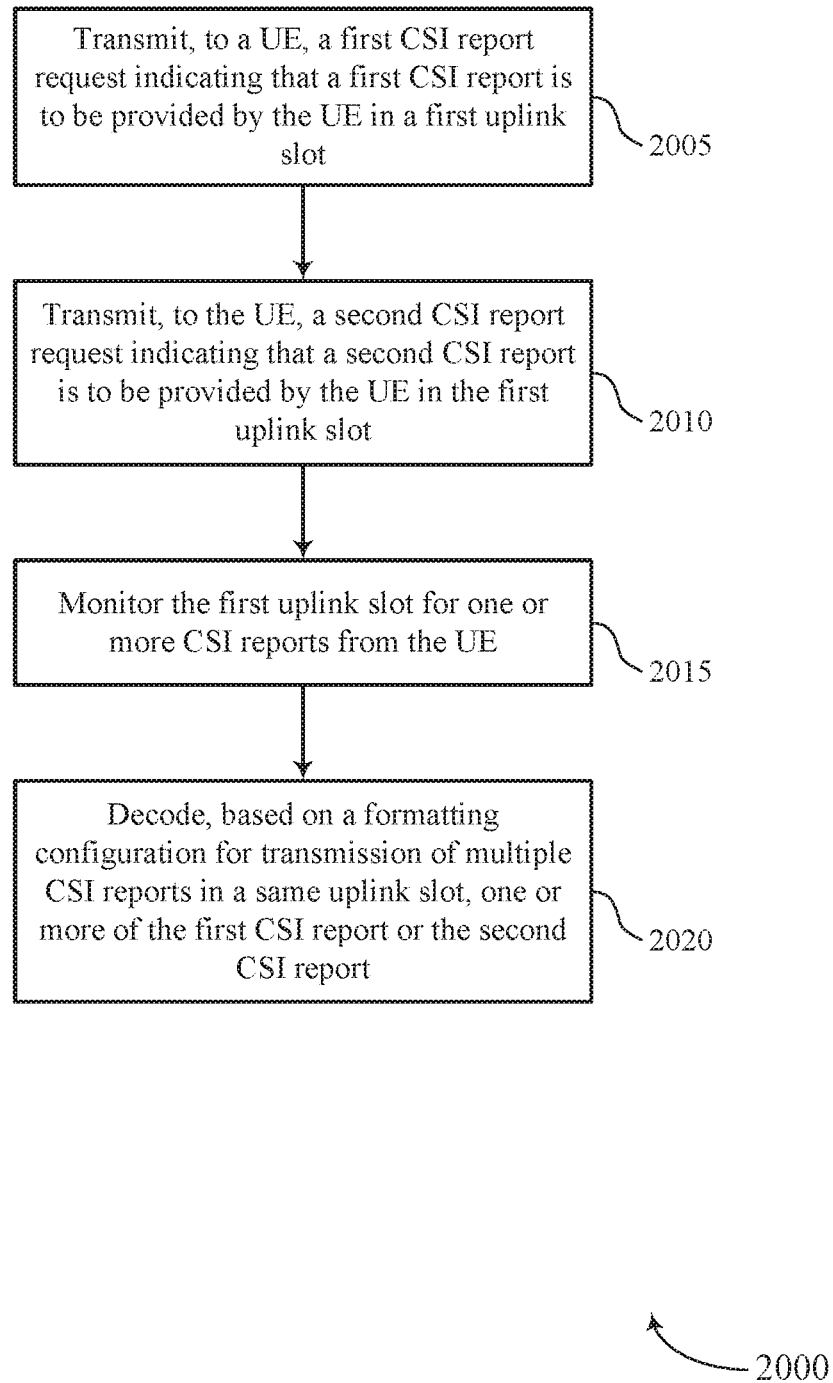

FIG. 20 shows a flowchart illustrating a method 2000 that supports non-periodic channel state information triggering and reporting in wireless communications in accordance with aspects of the present disclosure. The operations of method 2000 may be implemented by a base station 105 or its components as described herein. For example, the operations of method 2000 may be performed by a communications manager as described with reference to FIGS. 10 to 13. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, a first CSI report request indicating that a first CSI report is to be provided by the UE in a first uplink slot. The operations of 2005 may be performed according to the methods described herein. In some examples, aspects of the operations of 2005 may be performed by a CSI triggering component as described with reference to FIGS. 10 to 13.

At 2010, the base station may transmit, to the UE, a second CSI report request indicating that a second CSI report is to be provided by the UE in the first uplink slot. The operations of 2010 may be performed according to the methods described herein. In some examples, aspects of the operations of 2010 may be performed by a CSI triggering component as described with reference to FIGS. 10 to 13. In some cases, the base station may provide an indication of a number of CSI reports that are scheduled for transmission in the first uplink slot and an index value of the corresponding CSI report request within the number of CSI reports that are scheduled for transmission in the first uplink slot.

At 2015, the base station may monitor the first uplink slot for one or more CSI reports from the UE. The operations of 2015 may be performed according to the methods described herein. In some examples, aspects of the operations of 2015 may be performed by a CSI monitoring manager as described with reference to FIGS. 10 to 13.

At 2020, the base station may decode, based on a formatting configuration for transmission of multiple CSI reports in a same uplink slot, one or more of the first CSI report or the second CSI report. The operations of 2020 may be performed according to the methods described herein. In some examples, aspects of the operations of 2020 may be performed by a decoder as described with reference to FIGS. 10 to 13. In some cases, the decoding may include identifying a bitmap provided with the one or more CSI reports with consecutive bits that correspond to the number of CSI reports scheduled for the first uplink slot, and a value of each bit indicates whether the corresponding CSI report is included with the one or more CSI reports.

Figure 21:
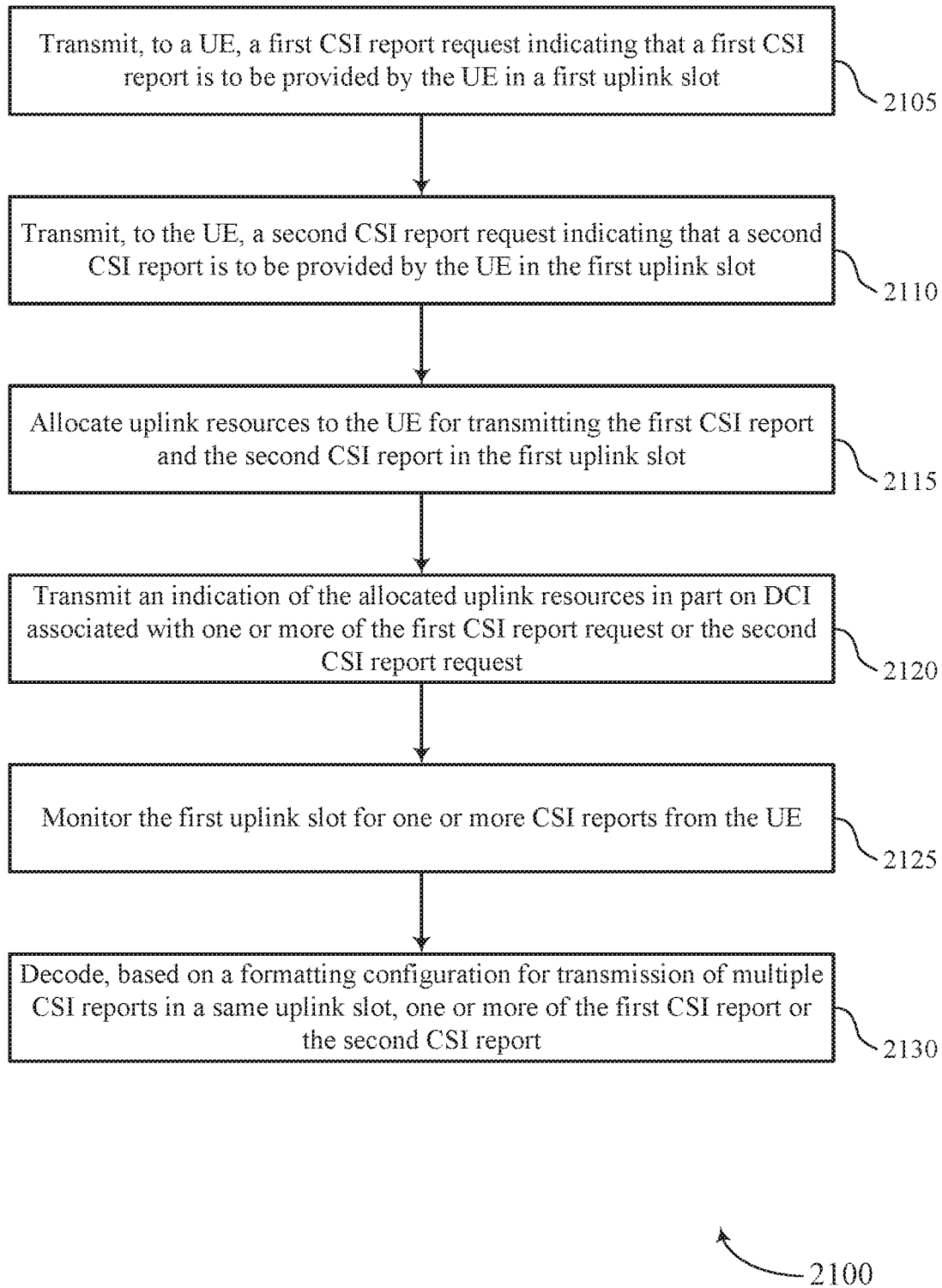

FIG. 21 shows a flowchart illustrating a method 2100 that supports non-periodic channel state information triggering and reporting in wireless communications in accordance with aspects of the present disclosure. The operations of method 2100 may be implemented by a base station 105 or its components as described herein. For example, the operations of method 2100 may be performed by a communications manager as described with reference to FIGS. 10 to 13. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, a first CSI report request indicating that a first CSI report is to be provided by the UE in a first uplink slot. The operations of 2105 may be performed according to the methods described herein. In some examples, aspects of the operations of 2105 may be performed by a CSI triggering component as described with reference to FIGS. 10 to 13.

At 2110, the base station may transmit, to the UE, a second CSI report request indicating that a second CSI report is to be provided by the UE in the first uplink slot. The operations of 2110 may be performed according to the methods described herein. In some examples, aspects of the operations of 2110 may be performed by a CSI triggering component as described with reference to FIGS. 10 to 13.

At 2115, the base station may allocate uplink resources to the UE for transmitting the first CSI report and the second CSI report in the first uplink slot. The operations of 2115 may be performed according to the methods described herein. In some examples, aspects of the operations of 2115 may be performed by a resource allocation manager as described with reference to FIGS. 10 to 13.

At 2120, the base station may transmit an indication of the allocated uplink resources in part on DCI associated with one or more of the first CSI report request or the second CSI report request. The operations of 2120 may be performed according to the methods described herein. In some examples, aspects of the operations of 2120 may be performed by a resource allocation manager as described with reference to FIGS. 10 to 13.

At 2125, the base station may monitor the first uplink slot for one or more CSI reports from the UE. The operations of 2125 may be performed according to the methods described herein. In some examples, aspects of the operations of 2125 may be performed by a CSI monitoring manager as described with reference to FIGS. 10 to 13.

At 2130, the base station may decode, based on a formatting configuration for transmission of multiple CSI reports in a same uplink slot, one or more of the first CSI report or the second CSI report. The operations of 2130 may be performed according to the methods described herein. In some examples, aspects of the operations of 2130 may be performed by a decoder as described with reference to FIGS. 10 to 13.

Figure 22:
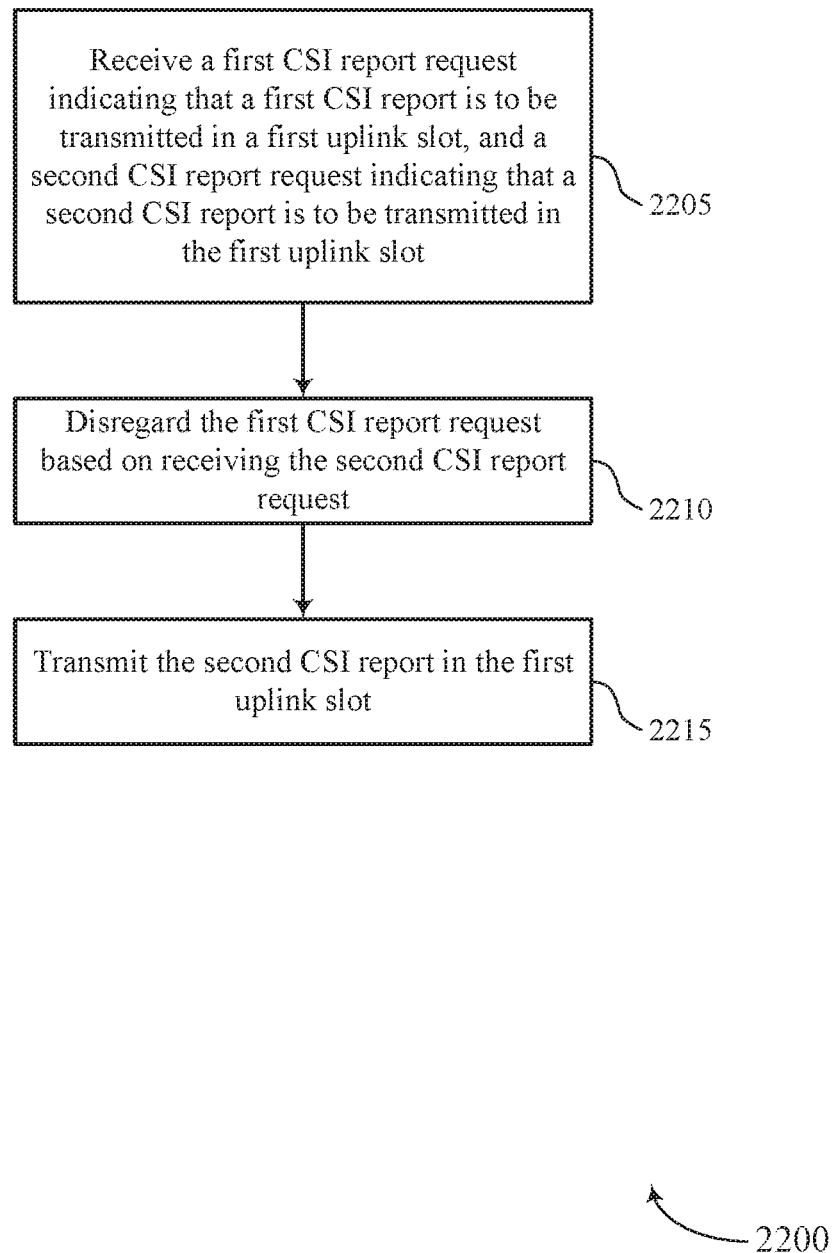

FIG. 22 shows a flowchart illustrating a method 2200 that supports non-periodic channel state information triggering and reporting in wireless communications in accordance with aspects of the present disclosure. The operations of method 2200 may be implemented by a UE 115 or its components as described herein. For example, the operations of method 2200 may be performed by a communications manager as described with reference to FIGS. 6 to 9. In some examples, a UE may execute a set of instructions to control the functional elements of the UE to perform the functions described below. Additionally or alternatively, a UE may perform aspects of the functions described below using special-purpose hardware.

At 2205, the UE may receive a first CSI report request indicating that a first CSI report is to be transmitted in a first uplink slot, and a second CSI report request indicating that a second CSI report is to be transmitted in the first uplink slot. The operations of 2205 may be performed according to the methods described herein. In some examples, aspects of the operations of 2205 may be performed by a CSI triggering component as described with reference to FIGS. 6 to 9.

At 2210, the UE may disregard the first CSI report request based on receiving the second CSI report request. The operations of 2210 may be performed according to the methods described herein. In some examples, aspects of the operations of 2210 may be performed by a CSI formatting component as described with reference to FIGS. 6 to 9.

At 2215, the UE may transmit the second CSI report in the first uplink slot. The operations of 2215 may be performed according to the methods described herein. In some examples, aspects of the operations of 2215 may be performed by a CSI transmission manager as described with reference to FIGS. 6 to 9.

Figure 23:
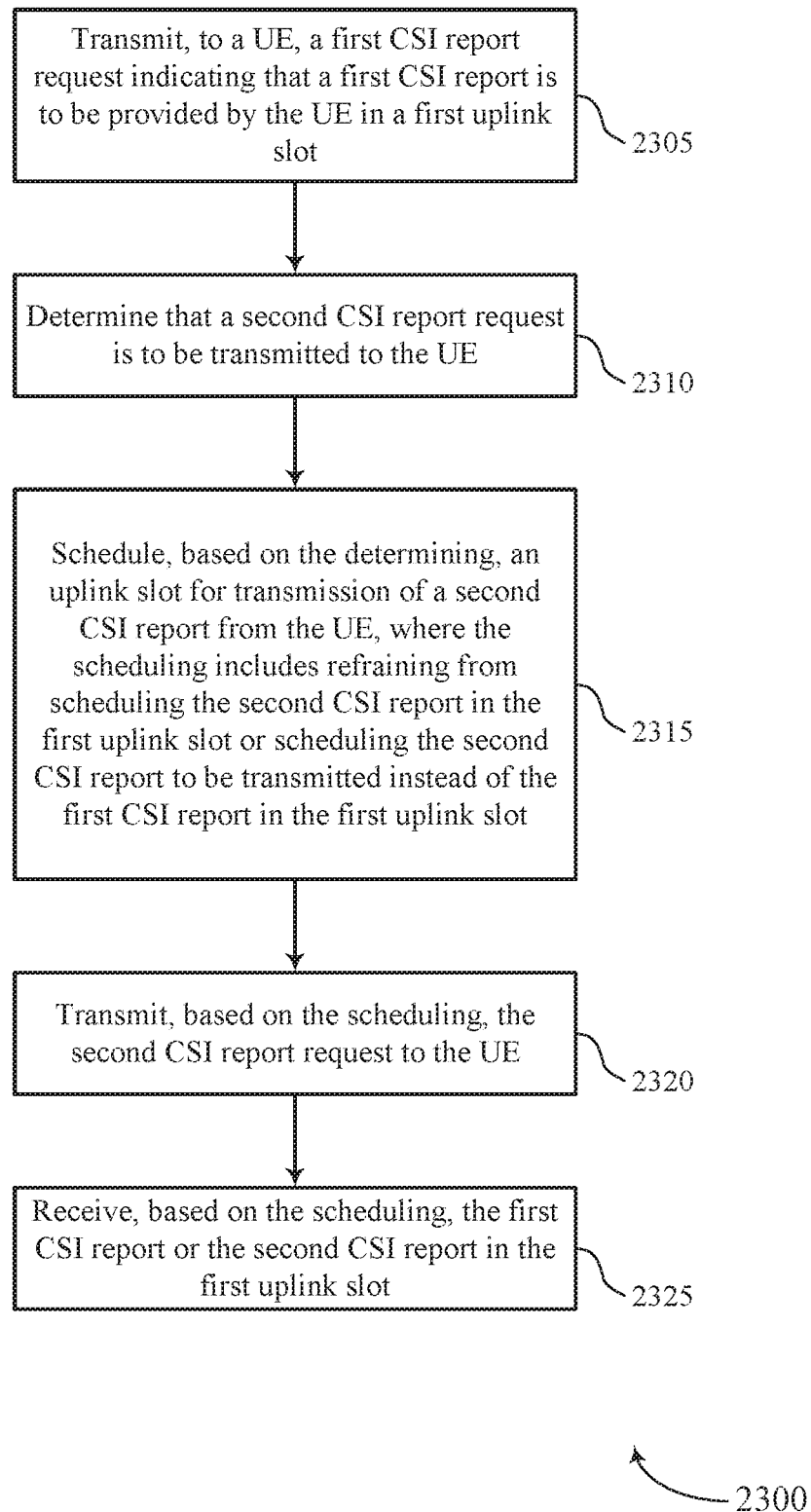

FIG. 23 shows a flowchart illustrating a method 2300 that supports non-periodic channel state information triggering and reporting in wireless communications in accordance with aspects of the present disclosure. The operations of method 2300 may be implemented by a base station 105 or its components as described herein. For example, the operations of method 2300 may be performed by a communications manager as described with reference to FIGS. 10 to 13. In some examples, a base station may execute a set of instructions to control the functional elements of the base station to perform the functions described below. Additionally or alternatively, a base station may perform aspects of the functions described below using special-purpose hardware.

At 2305, the base station may transmit, to a UE, a first CSI report request indicating that a first CSI report is to be provided by the UE in a first uplink slot. The operations of 2305 may be performed according to the methods described herein. In some examples, aspects of the operations of 2305 may be performed by a CSI triggering component as described with reference to FIGS. 10 to 13.

At 2310, the base station may determine that a second CSI report request is to be transmitted to the UE. The operations of 2310 may be performed according to the methods described herein. In some examples, aspects of the operations of 2310 may be performed by a CSI triggering component as described with reference to FIGS. 10 to 13.

At 2315, the base station may schedule, based on the determining, an uplink slot for transmission of a second CSI report from the UE, where the scheduling includes refraining from scheduling the second CSI report in the first uplink slot or scheduling the second CSI report to be transmitted instead of the first CSI report in the first uplink slot. The operations of 2315 may be performed according to the methods described herein. In some examples, aspects of the operations of 2315 may be performed by a resource allocation manager as described with reference to FIGS. 10 to 13.

At 2320, the base station may transmit, based on the scheduling, the second CSI report request to the UE. The operations of 2320 may be performed according to the methods described herein. In some examples, aspects of the operations of 2320 may be performed by a CSI triggering component as described with reference to FIGS. 10 to 13.

At 2325, the base station may receive, based on the scheduling, the first CSI report or the second CSI report in the first uplink slot. The operations of 2325 may be performed according to the methods described herein. In some examples, aspects of the operations of 2325 may be performed by a CSI monitoring manager as described with reference to FIGS. 10 to 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, in a first downlink slot, a first channel state information (CSI) report request indicating that a first CSI report is to be transmitted in a first uplink slot;
receiving, in a second downlink slot, a second CSI report request indicating that a second CSI report is to be transmitted in the first uplink slot, wherein the first CSI report and the second CSI report are non-periodic CSI reports;
formatting at least a subset of one or more of the first CSI report or the second CSI report according to a formatting configuration for transmission of multiple CSI reports in a same uplink slot, wherein the formatting configuration is based at least in part on a processing time between receipt of the second CSI report request and the first uplink slot; and
transmitting, based at least in part on the formatting, at least the subset of one or more of the first CSI report or the second CSI report in the first uplink slot.

2. The method of claim 1, further comprising:
identifying uplink resources for transmitting at least the subset of one or more of the first CSI report or the second CSI report based at least in part on downlink control information (DCI) associated with one or more of the first CSI report request or the second CSI report request.

3. The method of claim 2, wherein:
the identifying comprises identifying first uplink resources of a first component carrier (CC) based at least in part on first DCI associated with the first CSI report request and identifying second uplink resources of a second CC based at least in part on second DCI associated with the second CSI report request; and
the transmitting comprises transmitting the first CSI report via the first uplink resources of the first CC and transmitting the second CSI report via the second uplink resources of the second CC.

4. The method of claim 2, wherein the identifying comprises:
identifying uplink resources of a second component carrier (CC) for transmitting at least a portion of both the first CSI report and the second CSI report.

5. The method of claim 4, wherein the uplink resources of the second CC are indicated in DCI associated with the second CSI report request.

6. The method of claim 4, wherein the uplink resources of the second CC are identified based at least in part on a CC index value or a serving cell index value associated with each of a first CC associated with the first CSI report request and a second CC associated with the second CSI report request.

7. The method of claim 6, wherein the CC index value or the serving cell index value is selected to be a minimum or a maximum index value of a plurality of CC index values or serving cell index values.

8. The method of claim 1, wherein the formatting further comprises:
formatting other uplink control information (UCI) for transmission with at least the subset of one or more of the first CSI report or the second CSI report in the first uplink slot.

9. The method of claim 8, wherein the other UCI comprises hybrid acknowledgment receipt request (HARD) feedback information, scheduling request (SR) information, or combinations thereof.

10. The method of claim 1, wherein the formatting further comprises:
concatenating the first CSI report and the second CSI report into a single concatenated CSI report.

11. The method of claim 10, wherein an order for concatenating the first CSI report and the second CSI report is based at least in part on an index value of a serving cell or component carrier associated with each of the first CSI report and the second CSI report.

12. The method of claim 10, wherein an order for concatenating the first CSI report and the second CSI report is based at least in part on an order in which the first CSI report request and the second CSI report request are received.

13. The method of claim 10, wherein, for each of the first CSI report and the second CSI report, a plurality of fields within each CSI report are ordered based at least in part on an associated priority level.

14. The method of claim 1, wherein the formatting further comprises:
identifying a plurality of fields within each of the first CSI report and the second CSI report, the plurality of fields including at least a first field and a second field; and
concatenating the first field of the first CSI report and the first field of the second CSI report, followed by the second field of the first CSI report and the second field of the second CSI report, followed by any other fields of the first CSI report and the second CSI report, to form a single CSI report.

15. The method of claim 14, wherein the plurality of fields within each CSI report are ordered based at least in part on an associated priority level.

16. The method of claim 14, wherein an order for concatenating fields across the CSI reports is based at least in part on an index value of a serving cell or component carrier associated with each of the first CSI report and the second CSI report.

17. The method of claim 14, wherein an order for concatenating fields across the CSI reports is based at least in part on an order in which the first CSI report request and the second CSI report request are received.

18. The method of claim 1, wherein the formatting further comprises:
identifying at least a first portion and a second portion of each of the first CSI report and the second CSI report, wherein at least the second portion includes a plurality of fields including at least a first field; and
concatenating the first portion of the first CSI report and the first portion of the second CSI report, followed by a concatenation of the first field of the second portion of the first CSI report and the first field of the second portion of the second CSI report, followed by a concatenation of any other fields of the first CSI report and the second CSI report, to form a single CSI report.

19. The method of claim 18, wherein the first portion comprises CSI part 1 report information and the second portion comprises CSI part 2 information.

20. The method of claim 18, wherein the plurality of fields within the second portion of each CSI report are ordered based at least in part on an associated priority level.

21. The method of claim 18, wherein the formatting further comprises:
determining that allocated uplink resources for transmission of at least the subset of one or more of the first CSI report or the second CSI report are insufficient for transmission of all of the first CSI report and all of the second CSI report; and
dropping one or more fields of the plurality of fields of the second portion of the first CSI report and the second CSI report that extend beyond the allocated uplink resources.

22. The method of claim 1, wherein the formatting further comprises:
determining the processing time between receipt of the second CSI report request and the first uplink slot is less than a threshold value; and
dropping the second CSI report.

23. The method of claim 1, further comprising:
determining, based at least in part on an indication of a number of CSI reports provided with one or more of the first CSI report request or second CSI report request, that a third CSI report request for a third CSI report to be transmitted in the first uplink slot was lost; and
wherein the transmitting further comprises providing an indication that the third CSI report request was lost.

24. The method of claim 23, wherein:
the indication of the number of CSI reports provides a number of CSI reports scheduled for the first uplink slot and an indication of which CSI report of the number of CSI reports corresponds to the associated CSI report request; and the indication that the third CSI report request was lost comprises a bitmap with consecutive bits that correspond to the number of CSI reports scheduled for the first uplink slot, and a value of each bit indicates whether the corresponding CSI report is transmitted.

25. A method for wireless communication, comprising:
transmitting, to a user equipment (UE), a first channel state information (CSI) report request in a first downlink slot indicating that a first CSI report is to be provided by the UE in a first uplink slot;
transmitting, to the UE, a second CSI report request in a second downlink slot indicating that a second CSI report is to be provided by the UE in the first uplink slot, wherein the first CSI report and the second CSI report are non-periodic CSI reports;
monitoring the first uplink slot for one or more CSI reports from the UE; and
decoding, based at least in part on a formatting configuration for transmission of multiple CSI reports in a same uplink slot, one or more of the first CSI report or the second CSI report, wherein the formatting configuration is based at least in part on a processing time between the second downlink slot and the first uplink slot.

26. The method of claim 25, wherein the second CSI report request has identical content to the first CSI report request.

27. The method of claim 25, further comprising:
allocating uplink resources to the UE for transmitting the first CSI report and the second CSI report in the first uplink slot; and
transmitting an indication of the allocated uplink resources in part on downlink control information (DCI) associated with one or more of the first CSI report request or the second CSI report request.

28. The method of claim 27, wherein:
the allocating comprises allocating uplink resources of a second component carrier (CC) for transmitting at least a portion of both the first CSI report and the second CSI report; and
the transmitting comprises transmitting the indication of the allocated uplink resources in DCI associated with the second CSI report request.

29. The method of claim 28, wherein the uplink resources of the second CC are selected based at least in part on a CC index value or a serving cell index value associated with each of a first CC associated with the first CSI report request and the second CC associated with the second CSI report request.

30. The method of claim 28, wherein:
prior allocated resources for the first CSI report provided with the first CSI report request are re-allocated for other uplink transmissions different than the first CSI report.

31. The method of claim 25, wherein the formatting configuration comprises a concatenation of the first CSI report and the second CSI report into a single concatenated CSI report.

32. The method of claim 31, wherein an order in which the first CSI report and the second CSI report are concatenated is based on a serving cell index associated with each of the CSI reports, a component carrier (CC) index associated with each of the CSI reports, or an order in which the CSI report requests are transmitted.

33. The method of claim 25, wherein the formatting configuration comprises an order of fields within each CSI report based associated priority levels of a plurality of fields.

34. The method of claim 25, wherein the formatting configuration comprises a concatenation of a first portion of each CSI report followed by concatenation per field for a plurality of fields across CSI reports for second portion of each CSI report.

35. The method of claim 34, wherein the first portion comprises CSI part 1 report information and the second portion comprises CSI part 2 information.

36. The method of claim 25, wherein:
one or more of the first CSI report request or second CSI report requests includes an indication of a number of CSI reports that are scheduled for transmission in the first uplink slot and an index value of the corresponding CSI report request within the number of CSI reports that are scheduled for transmission in the first uplink slot.

37. The method of claim 36, wherein the decoding further comprises:
identifying a bitmap provided with the one or more CSI reports with consecutive bits that correspond to the number of CSI reports scheduled for the first uplink slot, and a value of each bit indicates whether the corresponding CSI report is included with the one or more CSI reports.

38. A method for wireless communication, comprising:
receiving a first channel state information (CSI) report request indicating that a first CSI report is to be transmitted in a first uplink slot, and a second CSI report request indicating that a second CSI report is to be transmitted in the first uplink slot;
disregarding the first CSI report request based at least in part on receiving the second CSI report request and a processing time between receipt of the second CSI report request and the first uplink slot being less than a threshold value; and
transmitting the second CSI report in the first uplink slot.

39. The method of claim 38, wherein the first CSI report request is received earlier in time than the second CSI report request, and the disregarding is based on the earlier received CSI report request.

40. The method of claim 38, wherein the disregarding is based at least in part on a serving cell index associated with each of the CSI reports, a component carrier (CC) index associated with each of the CSI reports, or an order in which the CSI report requests are transmitted.

41. A method for wireless communication, comprising:
transmitting, to a user equipment (UE), a first channel state information (CSI) report request indicating that a first CSI report is to be provided by the UE in a first uplink slot;
determining that a second CSI report request is to be transmitted to the UE and that a processing time between the second CSI report request and the first uplink slot is less than a threshold value;
scheduling, based at least in part on the determining, an uplink slot for transmission of a second CSI report from the UE, wherein the scheduling comprises scheduling the second CSI report to be transmitted instead of the first CSI report in the first uplink slot;
transmitting, based at least in part on the scheduling, the second CSI report request to the UE; and
receiving, based at least in part on the scheduling, the second CSI report in the first uplink slot.

42. The method of claim 41, wherein the UE is configured to transmit only a single CSI report in one uplink slot.

43. An apparatus for wireless communication, comprising:
- a processor; and
- memory coupled with the processor, wherein the memory comprises instructions executable by the processor to cause the apparatus to:
- receive, in a first downlink slot, a first channel state information (CSI) report request indicating that a first CSI report is to be transmitted in a first uplink slot;
- receive, in a second downlink slot, a second CSI report request indicating that a second CSI report is to be transmitted in the first uplink slot, wherein the first CSI report and the second CSI report are non-periodic CSI reports;
- format at least a subset of one or more of the first CSI report or the second CSI report according to a formatting configuration for transmission of multiple CSI reports in a same uplink slot, wherein the formatting configuration is based at least in part on a processing time between receipt of the second CSI report request and the first uplink slot; and
- transmit, based at least in part on the formatting, at least the subset of one or more of the first CSI report or the second CSI report in the first uplink slot.

44. The apparatus of claim 43, wherein the instructions are further executable by the processor to cause the apparatus to:
- identify uplink resources for transmitting at least the subset of one or more of the first CSI report or the second CSI report based at least in part on downlink control information (DCI) associated with one or more of the first CSI report request or the second CSI report request.

45. The apparatus of claim 44, wherein the instructions are further executable by the processor to cause the apparatus to:
- identify first uplink resources of a first component carrier (CC) based at least in part on first DCI associated with the first CSI report request and identify second uplink resources of a second CC based at least in part on second DCI associated with the second CSI report request; and
- transmit the first CSI report via the first uplink resources of the first CC and transmit the second CSI report via the second uplink resources of the second CC.

46. The apparatus of claim 44, wherein the instructions are further executable by the processor to cause the apparatus to:
- identify uplink resources of a second component carrier (CC) for transmitting at least a portion of both the first CSI report and the second CSI report.

47. The apparatus of claim 46, wherein the uplink resources of the second CC are indicated in DCI associated with the second CSI report request.

48. The apparatus of claim 46, wherein the uplink resources of the second CC are identified based at least in part on a CC index value or a serving cell index value associated with each of a first CC associated with the first CSI report request and a second CC associated with the second CSI report request.

49. The apparatus of claim 48, wherein the CC index value or the serving cell index value is selected to be a minimum or a maximum index value of a plurality of CC index values or serving cell index values.

50. The apparatus of claim 43, wherein the instructions are further executable by the processor to cause the apparatus to:
- format other uplink control information (UCI) for transmission with at least the subset of one or more of the first CSI report or the second CSI report in the first uplink slot.

51. The apparatus of claim 50, wherein the other UCI comprises hybrid acknowledgment receipt request (HARD) feedback information, scheduling request (SR) information, or combinations thereof.

52. The apparatus of claim 43, wherein the instructions are further executable by the processor to cause the apparatus to:
- concatenate the first CSI report and the second CSI report into a single concatenated CSI report.

53. The apparatus of claim 52, wherein an order for concatenating the first CSI report and the second CSI report is based at least in part on an index value of a serving cell or component carrier associated with each of the first CSI report and the second CSI report.

54. The apparatus of claim 52, wherein an order for concatenating the first CSI report and the second CSI report is based at least in part on an order in which the first CSI report request and the second CSI report request are received.

55. The apparatus of claim 52, wherein, for each of the first CSI report and the second CSI report, a plurality of fields within each CSI report are ordered based at least in part on an associated priority level.

56. The apparatus of claim 43, wherein the instructions are further executable by the processor to cause the apparatus to:
- identify a plurality of fields within each of the first CSI report and the second CSI report, the plurality of fields including at least a first field and a second field; and
- concatenate the first field of the first CSI report and the first field of the second CSI report, followed by the second field of the first CSI report and the second field of the second CSI report, followed by any other fields of the first CSI report and the second CSI report, to form a single CSI report.

57. The apparatus of claim 56, wherein the plurality of fields within each CSI report are ordered based at least in part on an associated priority level.

58. The apparatus of claim 56, wherein an order for concatenating fields across the CSI reports is based at least in part on an index value of a serving cell or component carrier associated with each of the first CSI report and the second CSI report.

59. The apparatus of claim 56, wherein an order for concatenating fields across the CSI reports is based at least in part on an order in which the first CSI report request and the second CSI report request are received.

60. The apparatus of claim 43, wherein the instructions are further executable by the processor to cause the apparatus to:
- identify at least a first portion and a second portion of each of the first CSI report and the second CSI report, wherein at least the second portion includes a plurality of fields including at least a first field; and
- concatenate the first portion of the first CSI report and the first portion of the second CSI report, followed by a concatenation of the first field of the second portion of the first CSI report and the first field of the second portion of the second CSI report, followed by a concatenation of any other fields of the first CSI report and the second CSI report, to form a single CSI report.

61. The apparatus of claim 60, wherein the first portion comprises CSI part 1 report information and the second portion comprises CSI part 2 information.

62. The apparatus of claim 60, wherein the plurality of fields within the second portion of each CSI report are ordered based at least in part on an associated priority level.

63. The apparatus of claim 60, wherein the instructions are further executable by the processor to cause the apparatus to:
   determine that allocated uplink resources for transmission of at least the subset of one or more of the first CSI report or the second CSI report are insufficient for transmission of all of the first CSI report and all of the second CSI report; and
   drop one or more fields of the plurality of fields of the second portion of the first CSI report and the second CSI report that extend beyond the allocated uplink resources.

64. The apparatus of claim 43, wherein the instructions are further executable by the processor to cause the apparatus to:
   determine the processing time between receipt of the second CSI report request and the first uplink slot is less than a threshold value; and
   drop the second CSI report.

* * * * *